United States Patent
Ikeda

(10) Patent No.: US 6,381,727 B1
(45) Date of Patent: Apr. 30, 2002

(54) APPARATUS AND METHOD FOR RECEIVING DATA WITH BIT INSERTION

(75) Inventor: Tamotsu Ikeda, Tokyo (JP)

(73) Assignee: Sony Corporation (JP)

( * ) Notice: Subject to any disclaimer, the term of this patent is extended or adjusted under 35 U.S.C. 154(b) by 16 days.

(21) Appl. No.: 09/588,303

(22) Filed: Jun. 6, 2000

Related U.S. Application Data

(63) Continuation of application No. 08/924,420, filed on Aug. 27, 1997, now abandoned.

(30) Foreign Application Priority Data

| Sep. 2, 1996 | (JP) | ............................................. 8-231745 |
| Sep. 3, 1996 | (JP) | ............................................. 8-233058 |

(51) Int. Cl.[7] ........................ H03M 13/41; H03M 13/45
(52) U.S. Cl. ........................ 714/780; 714/794; 714/796
(58) Field of Search ................................ 714/709, 780, 714/794, 796

(56) References Cited

U.S. PATENT DOCUMENTS

| 5,134,635 A | | 7/1992 | Hong et al. ..................... 375/94 |
| 5,204,876 A | | 4/1993 | Bruckert et al. ................ 375/1 |
| 5,220,570 A | | 6/1993 | Lou et al. ....................... 371/43 |
| 5,307,374 A | | 4/1994 | Baier ........................... 375/11 |
| 5,383,219 A | | 1/1995 | Wheatley, III et al. .......... 375/1 |
| 5,438,590 A | | 8/1995 | Tzukerman et al. ........ 375/259 |
| 5,457,704 A | * | 10/1995 | Hoeher et al. ................ 371/43 |
| 5,657,354 A | * | 8/1997 | Thesling, III et al. ...... 375/332 |
| 5,721,745 A | * | 2/1998 | Hladik et al. ................. 371/43 |
| 5,757,863 A | | 5/1998 | Lim ............................ 375/341 |
| 5,790,595 A | * | 8/1998 | Benthin et al. .............. 375/224 |
| 5,809,089 A | | 9/1998 | Vasic ........................... 375/341 |
| 5,812,613 A | | 9/1998 | Zogg ............................ 375/343 |
| 5,867,538 A | | 2/1999 | Liu ............................. 375/341 |
| 5,968,198 A | * | 10/1999 | Hassan et al. ............... 714/752 |

FOREIGN PATENT DOCUMENTS

EP     0 537 706 A2     4/1993

OTHER PUBLICATIONS

Liu, "Soft–Decision Decoding of a Bit–Interleaved Convolutionally Encoded Code Division Multiple Access System over Rayleigh Fading Channels", PIMRC '92, pp. 128–132.*

(List continued on next page.)

*Primary Examiner*—S. Baker
(74) *Attorney, Agent, or Firm*—Lerner, David, Littenberg, Krumholz & Mentlik, LLP

(57) ABSTRACT

A receiver for data encoded as a series of symbols, each including a plurality of components such as the I and Q components of 16-QAM symbols or other multi-value multi-phase system. Each component denotes values for a plurality of bits. Probability calculation circuits 111-1 through 111-16 use the values of the components constituting each received symbol to calculate the probability that each one of the possible symbols was transmitted and received. Metric calculation circuits 112-1 through 112-4 calculate a bit metric for each bit denoted by the symbol. The bit metric represents the probability that the bit having a specified value was transmitted. The bit metric may be calculated by adding the probabilities calculated by the probability calculation for those possible symbols having a component denoting the specified value of the bit. For example, the sum of the probabilities of all symbols denoting a first bit value of zero gives the probability that a zero bit value was transmitted and received. The data represented by the symbols may represent data encoded by a convolutional code, and the bit metrics may be supplied to a decoder such as a Viterbi decoder.

14 Claims, 18 Drawing Sheets

OTHER PUBLICATIONS

Le Goff et al., "Turbo–Codes and High Spectral Efficiency Modulation", SUPERCOMM/ICC '94, pp. 645–649.*

Benthin et al., "Viterbi Decoding of Convolutional Codes with Reliability Information for a Noncoherent RAKE–Receiver in a CDMA–Environment", GLOBECOM '94, pp. 1758–1762.*

Hansson et al., "Channel Symbol Expansion Diversity— Improved Coded Modulation for the Rayleigh Fading Channel", ICC '96, pp. 891–985.*

Benedetto et al., "Parallel Concatenated Trellis Coded Modulation", ICC '96, pp. 974–978.*

Caire G. Et al., "Capacity of Bit–Interleaved Channels", Electronics Letters, GB, IEE Stevenage, vol. 32, No. 12, Jun. 6, 1996, pp. 1060–1061.

Ephraim Zehavi, "8–PSK Trellis Codes for a Rayleigh Channel", IEEE Transactions On Communications, US, IEEE Inc. New York, vol. 40, No. 5, May 1992, pp. 873–884.

Yasuda Y et al., "High–Rate Punctured Convolutional Codes For Soft Decision Viterbi Decoding", IEEE Transaction on Communications, US, IEEE Inc., New York, vol. COM–32, No. 3, Mar. 1984, pp. 315–319.

Chang et al., "Comparison of Two Convolutional Orthogonal Coding Techniques for CDMA Radio Communications Systems", IEEE Transactions on Communications, vol. 43, No. 6, Jun. 1993, pp. 2028–2037.

Nakagawa et al., "Bit–by Bit Interleaved Trellis Coded MPSK with Differential Detection on Rayleigh Fading Channels", IEEE 4th Vehicular Technology Conference, Jul. 25–28, 1995, pp. 659–663.

Caire et al., "Capacity of Bit–Interleaved Channels", Electronics Letters, vol. 32, No. 12, Jun. 6, 1996, pp. 1060–1061.

Zehavi, "8–PSK Trellis Codes on Rayleigh Channel", IEEE CH2681–5/89/0000–0536, pp. 536–540.

Liu, "Soft–Decision Decoding of a Bit–Interleaved Convolutionally Encoded Code Division Multiple Access System over Rayleigh Fading Channels", IEEE 0–7803–0841–7/92, pp. 128–132.

Benthin et al., "Viterbi Decoding of Convolutional Codes with Reliability Information for a Noncoherent RAKE–Receiver in a CDMA–Environment", IEEE 0–7803–1820–X/94, pp. 1758–1762.

* cited by examiner

APPARATUS AND METHOD FOR RECEIVING DATA WITH BIT INSERTION

CROSS-REFERENCE TO RELATED APPLICATIONS

The present application is a continuation of Application Ser. No. 08/924,420, filed on Aug. 27, 1997, now abandoned.

FIELD OF THE INVENTION

The present invention relates to an apparatus and a method for receiving data and, more particularly, to a data receiver and a data receiving method for receiving multi-component signals representing values for several data bits.

BACKGROUND OF THE INVENTION

In the U.S.A., digital broadcasting bas already been started. Also in Europe, the organization for standardization "Digital Video Broadcasting (DVB)" has been formed to introduce digital TV broadcasting and its standard system is now being made. Such digital broadcasting is described, for example, in "Europe set to start digital satellite broadcasting in 1996 after successful U.S. nationwide services", NJKKEI ELECTRONICS 1.15, 1996 (No. 653), pp. 139–151.

In digital broadcasting and in other types of data transmission, it is desirable to minimize the power in the signal. This in turn reduces the ratio of signal power to noise power, and increases the probability of transmission errors. An error-correcting code is used to obtain a coding gain which compensates for this effect. Ordinarily, in a system using such a method, error-correcting coding is performed on the transmitting side while error-correcting decoding is performed on the receiving side.

A convolutional code is particularly advantageous for transmission on a communication path with a low signal power to noise power ratio (S/N ratio). As further explained below, a convolutional code effectively spreads the information contained in each bit of the original message into several bits of the transmitted signal. The receiver determines the value of each original bit from the received signals representing the bits of the transmitted signal. Because the transmitted signal contains redundant information, the original bit values can still be determined with good accuracy even if some of the bit values in the transmitted signal are corrupted by noise in the transmission path. The receiver can use a probabilistic or "soft" decoding scheme. If a most likely path decoding method such as Viterbi decoding is used, soft decision decoding can be performed easily and a high coding gain can be obtained.

In a "punctured" convolutional code, a sequence of bits output from a convolutional encoder is thinned out by deleting some of the bits in accordance with a certain rule. Thus, the redundancy introduced by convolutional encoding is reduced, and a plurality of code rates can be achieved easily.

It is also possible to improve tolerance to noise in a transmission path by diffusing bits of an encoded signal, such as the bits of a code sequence output from a punctured convolutional code encoder, in accordance with a certain rule. "Diffusing" in this context refers to shuffling or reordering the bits.

FIG. 9 shows an example of a transmitter proposed in accordance with the standard DVB-T for DVB ground wave television. This transmitter uses a punctured convolutional code, bit diffusion and a quadrature phase-shift keying (QPSK) system.

In the example shown in FIG. 9, serial data output from an information source 1 is input to a convolutional encoder 2, and mother code sequences X and Y are generated by the encoder 2. Each of X and Y represents a 1-bit code sequence. Thus, each bit of original data from information source 1 results in generation of two bits of mother code data; one bit in sequence X, and one bit in sequence Y. Stated another way, in this example, the code rate of convolutional encoder 2 is set to 1/2.

FIG. 10 shows an example of the convolutional encoder 2. The particular encoder 2 is not arranged in accordance with the DVB-T standard; it is a simple encoder intended for explanation of the principle of convolutional processing. In this example, 1-bit serial data output from an information source 1 is input through a terminal 21, delayed one clock cycle by each of delay circuits 22 and 23 and thereafter output to adder circuits 24 and 25. The output from terminal 21 and the output from delay circuit 22 are also supplied to the adder circuit 24. Adder circuit 24 adds these groups of data together (by exclusive OR operation) and outputs the result of this addition as data X through a terminal 26. Adder circuit 25 adds the output from the terminal 21 and the output from the delay circuit 23 together (by exclusive OR operation) and outputs the result of this addition as data Y through a terminal 27.

In this example, the two mother code bits X and Y which are obtained when one original bit is input at terminal 21 will depend on the internal state of the delay circuits 22 and 23 prior to arrival of that original bit. The state of the delay circuits 22 and 23 in turn will depend upon the values of the bits which were previously supplied through terminal 21. Stated another way, the information in each bit of the original message is spread among several bits of the mother code sequences. In this example, the constraint length is 3, the number of internal delay elements is 2, the number of states is 4, and the code rate is 1/2.

FIG. 11 is a state diagram showing state transitions of the convolutional encoder shown in FIG. 10. If an original code bit with value 0 is input through terminal 21 when the state is 00 (when each of the outputs of the delay elements 22 and 23 is 0), (XY)=(00) is output through the terminals 26 and 27. That is, mother code bit 0 is output as data X through terminal 26, whereas mother code bit 0 is output as data Y through terminal 27. The state is also 00 after the transition resulting from the 0 input; the outputs of each of delay elements 22 and 23 remain 0. In the case where 1 is input when the state is 00, (XY)=(11) is output and the state changes to 10. In the case where 0 is input when the state is 01, (XY)=(11) is output and the state changes to 00. In the case where 1 is input when the state is 01, (XY)=(00) is output and the state changes to 10.

The inputs and outputs associated with these and other states are shown in FIG. 11 as expressions such as "1/01", denoting input/outputs. In each such expression, the first digit represents the input, whereas the second digit represents the X output resulting from that input and the last digit represents the Y output resulting from the input.

The mother code sequences X and Y provided by convolutional encoder 2 are input to a bit erase circuit 3, which performs bit erasing in accordance with a predetermined rule, and forms the remaining bits into a serial bit stream constituting a punctured convolutional code message. The bit erase circuit 3 erases data at predetermined positions in the mother code sequences (XY), in accordance with an erase map:

X: 10
Y: 11

Bits corresponding to 1 in the erase map are transmitted but bits corresponding to 0 in the map are not transmitted (erased). Stated another way, every other bit in the X mother code sequence is omitted from the serial bit stream formed by the bit erase circuit. Thus, if the outputs of convolutional encoder 2 in response to two successive inputs are X1,Y1 in response to the first input and X2,Y2 in response to the next input, the bit erase circuit will transmit a serial stream X1Y1Y2. The same series of operations is repeated during every two successive clock cycles of the apparatus.

The bit erase circuit reduces redundancy in the coded message and thus changes the code rate. Considering the convolutional encoder and the bit erase circuit together, the number of bits in the original message input to the convolutional encoder 2 is 2 and the number of bits in the punctured convolutional code output from the bit erase circuit 3 is 3, so that the code rate is 2/3.

The bit stream or serialized punctured convolutional code sequence output from the bit erase circuit 3 is input to a serial-parallel converter 4. Serial-parallel converter 4 converts one input data sequence X1,Y1,Y2, . . . into two data sequences (x, y).

The data sequences x and y from converter 4 undergo bit diffusion in bit diffusion circuits 5-1 and 5-2. The order of bits is in each sequence is diffusively changed (made complex). Each of the bit diffusion circuits 5-1 and 5-2 performs bit diffusion by changing the order of the bits in data sequence x or y in accordance with a predetermined rule. Ordinarily, the rules applied by. the bit diffusion circuits 5-1 and 5-2 are different from each other.

In an example of such bit diffusion, M bits of input data is assumed to be one block, and a suitable value s is set. The bit diffusion process is performed by replacing a vector formed of an M-bit input sequence:

(B0, B1, . . . , Bk, . . . , BM−1) with a vector formed of an M-bit output sequence after diffusion:

(B'0, B'1, . . . , B'n, . . . , B'M−1), where B'n=Bk (n=k+s mod M).

The bit diffusion circuits 5-1 and 5-2 may use the same algorithm with different values of s.

Data sequences x' and y' after bit diffusion, constituting a diffused punctured convolutional code message, are output from the bit diffusion circuits 5-1 and 5-2, and input to a signal point assignment circuit 6.

Signal point assignment circuit 6 outputs coordinate data I' and Q' of signal points representing an in-phase component (I component) and a quadrature component (Q component) orthogonal to each other. For example, the assignment of data (x', y') as signals in the transmission channel is performed on the basis of the quadrature phase shift keying (QPSK) symbol set as shown in FIG. 12. That is, the data is assigned so that when (x', y')=(0, 0), (I', Q')=(1/√2,1/√2) is set;
when (x', y')=(0, 1), (I', Q')=(1/√2,−1/√2) is set;
when (x', y')=(1, 0), (I', Q')=(−1/√2,1/√2) is set; and
when (x', y')=(1, 1), (I', Q')=(−1/√2,−1/√2) is set. Each set of components (I',Q') constitutes one QPSK symbol. Each such symbol includes a first component I' denoting the value of one bit x' in the diffused punctured convolutional code message and a second component Q' denoting the value of another bit y' in the diffused punctured convolutional code message.

A symbol diffusion circuit 7 reorders the QPSK symbols prescribed by data I' and Q' output from the signal point assignment circuit 6 to obtain symbols S (I, Q). This diffusion processing increases resistance of the system to burst errors in the transmission path. The diffusion circuit changes the order of symbols S' represented by (I', Q') in accordance with a predetermined rule to obtain the diffused symbols S represented by (I,Q).

For example, if N−1 symbols form a diffusion unit block and if a number G smaller than N is selected such that G and N are prime to each other, diffusion is executed as replacement of a vector formed of symbols before diffusion:

(S'1, S'2, . . . , S'k, . . . , S'N−1) with a vector formed of symbols after diffusion:

(S1, S2, . . . , Sn, . . . , SN−1), where Sn=S'k (n=G^k mod N). In this expression, G^k means G to the kth power.

Diffusion circuit 7 outputs the I and Q components of the symbols after symbol diffusion. A modulator 8 modulates a carrier wave with the I and Q components of symbols S on the basis of the orthogonal frequency division multiplex (OFDM) method and transmits the modulated wave through an antenna 9.

FIG. 13 shows the configuration of a receiver for receiving data from the transmitter shown in FIG. 9. A demodulator 32 demodulates an electric wave received through an antenna 31 and outputs a series of signals, corresponding to the series of symbols supplied to the modulator 8 of the transmitter. Each such signal includes an I component and a Q component corresponding to the I and Q components of the transmitted symbols. It should be appreciated that the I and Q components of the signals output by demodulator are not perfect duplicates of the I and Q values supplied to modulator of the transmitter. Noise and other imperfections in the transmission path cause variations in the received I and Q values. The I and Q values constituting the received signals are handled in the receiver as real values, i.e., either as analog values or, preferably, as multi-bit digital values. Demodulator 32 supplies the received signals as series of I and Q components.

A symbol diffusion reversal circuit 33 processes the received signals in a manner inverse to the symbol diffusion processing in the symbol diffusion circuit 7 of the transmitter ( FIG. 9). Thus, the diffusion reversal circuit restores the received signals to the original order of the symbols before the order was changed in the symbol diffusion circuit 7. This diffusion reversal operation, if expressed by using the same N and G as those used with respect to the symbol diffusion circuit 7, is replacement of a vector formed of signals before diffusion reversal processing:

(S1, S2, . . . , Sn, . . . , SN−1) with a vector formed of signals after diffusion reversal processing:

(S'1, S'2, . . . , S'k, . . . , S'N−1), where Sn=S'k (n=G^k mod N).

I component values I' and Q component values Q' output from the symbol diffusion reversal circuit 33 are supplied to bit diffusion reversal circuits 34-1 and 34-2, respectively. The bit diffusion reversal circuits process the I' and Q' components output in a manner inverse to the bit diffusion applied by the bit diffusion circuits 5-1 and 5-2 of the transmitter. Thus, bit diffusion reversal circuit 34-1 processes items of data (I component values) in blocks of M items. A vector formed of a sequence of output M items after diffusion reversal processing:

(B0, B1, . . . , Bk, . . . , BM−1) is obtained from a vector formed of a sequence of input M items:

(B'0, B'1, . . . , B'n, . . . , B'M−1), where B'n=Bk (n=k+s mod M).

The value s used in bit diffusion reversal processing in the bit diffusion reversal circuit 34-1 is the same as the value s used in the bit diffusion circuit 5-1 of the transmitter. Bit diffusion reversal circuit 34-2 operates in the same manner, but uses a value s equal to the value s used by the other bit diffusion reversal circuit 5-2.

The two data sequences (x, y) output from the bit diffusion reversal circuits 34-1 and 34-2 are input to a parallel-serial converter 35 to be converted into one data sequence to be supplied to a bit insertion circuit 36. The parallel-serial converter 35 performs the operation reverse to that of the serial-parallel converter 4 to convert the two data sequences (x, y) into one data sequence.

The bit insertion circuit 36 splits the serial data stream into two parallel data streams and performs bit insertion processing inverse to the bit erase processing in the bit erase circuit 3 shown in FIG. 9. The bit insertion circuit 36 uses the same map used by the bit erase circuit of the transmitter:

X: 10

Y: 11

Thus, when data is input in the order of x1, y1, y2 to insertion circuit 36, an arbitrary dummy data item (here assumed to be 0) is inserted at the position corresponding to the erased data item and X1 (=x1), 0 are output as X data, and Y1 (=y1), Y2 (=y2) are output as Y data in this order.

The output data sequences X and Y are supplied to a Viterbi decoder 37. Also, an insertion flag indicating the position at which the dummy data is inserted is supplied to the Viterbi decoder 37. At this stage of processing, the individual data elements of sequences X and Y (other than the dummy values) are still real numbers corresponding to the values of the I and Q components in the received signals, rather than single-bit 1 or 0 elements. The real numbers in these data sequences correspond to the 1 and 0 values of the mother codes output by the convolutional encoder 2 of the transmitter. If the transmission channel were a perfect channel, each number corresponding to a 0 in the mother code would have exactly the same value, equal to the nominal value $1/\sqrt{2}$ assigned by the signal point assignment circuit of the transmitter, whereas each number corresponding to a 1 in the mother code would have the other nominal value $-1/\sqrt{2}$. However, noise and other imperfections in the transmission path between the transmitter and receiver will cause these values to vary somewhat from the nominal values.

The Viterbi decoder 37 decodes the data sequences X and Y to recover the reproduced information corresponding to the original message. Thus, the decoder performs Viterbi decoding according to the state transitions (FIG. 11) of the convolutional encoder 2.

FIG. 14 shows an example of the Viterbi decoder 37. Data X and Y output from the bit insertion circuit 36 are supplied to input terminals 62-1 and 62-2 respectively for input to branch metric calculation circuits 63-1 to 63-4. Each of the branch metric calculation circuits 63-1 to 63-4 calculates, as a branch metric, the distance between the input data (X, Y) and an associated one of the coordinate points defined by nominal values shown in FIG. 12.

Outputs (branch metrics) BM00 and BM11 from the branch metric calculation circuits 63-1 and 63-4 are input to add compare select (ACS) circuits 64-1 and 64-3. A output (branch metric) BM01 from the branch metric calculation circuit 63-2 and an output (branch metric) BM10 from the branch metric calculation circuit 63-3 are input to ACS circuits 64-2 and 64-4.

Four state metric storage units 66-1 through 66-4 are provided. State metric storage unit 66-1 has an input 66-1a connected to an output of ACS unit 64-1. In like manner, each of the other state metric storage units 66-2, 66-3 and 66-4 has an input connected to the outputs of ACS units 64-2, 64-3 and 64-4, respectively.

An output (state metric) SM00 from state metric storage 66-1 and an output (state metric) SM01 from state metric storage 66-2 are also input to the ACS circuits 64-1 and 64-3. An output (state metric) SM10 from state metric storage 66-3 and an output (state metric) SM11 from state metric storage 66-4 are also input to the ACS circuits 64-2 and 64-4.

Each of the ACS circuits 64-1 to 64-4 calculates the sum of one of the input branch metrics BM and the corresponding state metric SM and calculates the sum of the other input branch metric BM and the corresponding state metric SM. Each of the ACS circuits 64-1 to 64-4 compares the two sums with each other to select the smaller one of them, outputs the smaller sum as a new state metric SM to the corresponding one of the state metric storage units 66-1 to 66-4, and outputs signals SEL00 to SEL11 representing the selection result to a path memory 65. State metrics SM00 to SM11 from the state metric storages 66-1 to 66-4 are also input to the path memory 65.

Each of the state metric storages 66-1 to 66-4 can be reset by a signal which is input via a terminal 61. The path memory 65 outputs the result of decoding through a terminal 67.

The operation of the Viterbi decoder 37 will be described in more detail. Branch metric calculation circuit 63-1 calculates the distance between the input data (X, Y) and the coordinate point $(1/\sqrt{2}, 1/\sqrt{2})$ as branch metric BM00. Similarly, branch metric calculation circuit 63-2 calculates the distance between the input data (X, Y) and the coordinate point $(1/\sqrt{2}, -1/\sqrt{2})$ as branch metric BM01. Branch metric calculation circuit 63-3 calculates the distance between the input data (X, Y) and the coordinate point $(-1/\sqrt{2}, 1/\sqrt{2})$ as branch metric BM10. Branch metric calculation circuit 63-4 calculates the distance between the input data (X, Y) and the coordinate point $(-1/\sqrt{2}, -1/\sqrt{2})$ as branch metric BM11. In computing the branch metrics, distance calculation with respect to the inserted dummy data is omitted in response to the insertion flag supplied from the bit insertion circuit 36. That is, the distance between each inserted dummy data value and the related coordinate point is set to a zero value as further discussed below with reference to FIG. 15.

ACS circuit 64-1 performs two calculations shown below corresponding to the state transitions of the convolutional encoder 2, and selects one of the results of these calculations with a higher likelihood, i.e., the smaller one of the calculation results. Information SEL00 on this selection is supplied to the path memory 65 while the calculation result is SM00 is supplied to the state metric storage 66-1.

$$SM00+BM00 \quad (1)$$

$$SM01+BM11 \quad (2)$$

SM00 is the value of the state metric storage 66-1 remaining from the preceding clock cycle, i.e., the value of the state metric resulting from processing the preceding X and Y values in the data sequence. Similarly, SM01 is the value remaining in state metric storage 66-2 from the preceding clock cycle. BM00 is the result of calculation of the branch metric calculation circuit 63-1, and BM11 is the result of calculation of the branch metric calculation circuit 63-4.

If the result of calculation (1) is smaller, SEL00=0 is supplied to the path memory 65. If the result of calculation (2) is smaller, SEL00=1 is supplied to the path memory 65.

In the former case, SM00+BM00 is stored as new state metric SM00 in the state metric storage 66-1. In the latter case, SM01+BM11 is stored as new state metric SM00 in the state metric storage 66-1.

This calculation will be described with reference to the state transition diagram of FIG. 11. The branch metrics can be understood as representing the likelihood that the input data (X,Y) represents the mother code bits produced by a transition of the convolutional encoder which resulted in particular outputs. For example, if input data X,Y having values very close to the nominal values $(1/\sqrt{2}, 1/\sqrt{2})$ is received, and hence the magnitude of BM00 is small, then it is likely that the input data was produced by a transition of the convolutional encoder 2 at the transmitter which produced outputs (mother code bits X,Y) of 00. The state metrics can be understood as representing the probability that the convolutional encoder 2 at the transmitter which produced the data was in a particular state, with smaller values of the state metrics representing greater probability. For example, a smaller value of SM00 indicates a high probability that the encoder was in state 00. There are two paths to the state 00. The first path is defined by input of 0 in the state 00 and by output of 00. A corresponding comparative calculation is represented by expression (1). The second path is defined by input of 0 in the state 01 and by output of 11. A corresponding comparative calculation is represented by expression (2). The smaller one of the two calculation results is supplied as new state metric SM00 to the state metric storage 66-1.

Each of the ACS circuits 64-2 to 64-4 also performs the same operation. Each of the state metric storages 66-1 to 66-4 is reset to 0 in an initial stage of the operation of the system. Control of this resetting is performed by a controller (not shown) via the terminal 61.

Path memory 65 generates the reproduced data which is the final output of the receiver, in accordance with the state transitions shown in FIG. 11. The path memory uses selection information SEL00 to SEL11 supplied from the ACS circuits 64-1 to 64-4 and the state metrics SM00 to SM11 supplied by state metric storage units 66-1 to 66-4.

FIG. 15 shows a branch metric calculation circuit 63-1 in detail. Data X input through the terminal 62-1 is input to a subtracter circuit 51, which subtracts $1/\sqrt{2}$ supplied from a generator circuit 52 from data X. The difference output from the subtracter circuit 51 is supplied to two input terminals of a multiplier circuit 53 and multiplied by itself (i.e., squared). A selector 203 is supplied with an output from the multiplier circuit 53 and with a 0 output from a generator circuit 202. When the flag indicating insertion in X is input to the selector 203 from bit insertion circuit 36 (FIG. 13) via a terminal 201, the selector 203 selects the 0 generated by the generator circuit 202. When no flag indicating insertion in X is input, the selector 203 selects the output from the multiplier circuit 53. The selector 203 outputs the selected value to an adder circuit 54.

Data Y input via the terminal 62-2 is input to a subtracter circuit 55, which subtracts $1/\sqrt{2}$ supplied from a generator circuit 56 from data Y. The output from subtracter circuit 56 is supplied to two input terminals of a multiplier circuit 57 to be multiplied by itself (i.e., squared). A selector 206 is supplied with an output from the multiplier circuit 57 and with an output from a 0 generator circuit 205. When the flag indicating insertion in Y is input to the selector 206 via a terminal 204, the selector 206 selects 0 from circuit 205. When no flag indicating insertion in Y is input, the selector 206 selects the output from the multiplier circuit 57. The selector outputs the selected value to adder circuit 54. The adder circuit 54 calculates the sum of the outputs from the selectors 203 and 206 and outputs the sum as branch metric BM00.

Thus, when no insertion flag is supplied, the operation of this branch metric calculation circuit is as described below. The subtracter circuit 51 outputs $X-1/\sqrt{2}$, and the multiplier circuit 53 squares this value to output $(X-1/\sqrt{2})^2$. Also, the subtracter circuit 55 outputs $Y-1/\sqrt{2}$, and the multiplier circuit 57 squares this value to output $(Y-1/\sqrt{2})^2$. The adder circuit 54 calculates the sum of the outputs from the multiplier circuits 53 and 57, i.e., $(X-1/\sqrt{2})^2+(Y-1/\sqrt{2})^2$ and outputs this value as branch metric BM00.

On the other hand, when the flag indicating insertion in X is input, the selector 203 outputs 0, so that the output from the adder circuit 54 is $(Y-1/\sqrt{2})^2$. When the flag indicating insertion in Y is input, the selector 206 outputs 0 and the output from the adder circuit 54 is $(X-1/\sqrt{2})^2$.

Each of the branch metric calculation circuits 63-2 to 63-4 have the same circuit configuration as that shown in FIG. 15 and performs the same operation. In the branch metric calculation circuit 63-2, however, the output of the generator circuit 52 is $1/\sqrt{2}$ and the output of the generator circuit 56 is $-1/\sqrt{2}$. In the branch metric calculation circuit 63-3, the outputs of the generator circuits 52 and 56 are $-1/\sqrt{2}$ and $1/\sqrt{2}$, respectively. In the branch metric calculation circuit 63-4, the output of each of the generator circuits 52 and 56 is $-1/\sqrt{2}$.

FIG. 16 is a block diagram of the path memory 65. Selection information items SEL00 to SEL11 output from the ACS circuits 64-1 to 64-4 are supplied to terminals 71-1 to 71-4. The selection information items SEL00 to SEL11 are input as control signals to two-input one-output selectors 73-1 to 73-4, respectively. A fixed data item 0 is supplied from a terminal 72-1 as two inputs to the selector 73-1, whereas fixed data item 0 is supplied from terminal 72-2 as the two inputs of selector 73-2. Similarly, a fixed data item 1 is supplied from terminals 72-3 and 72-4 as two inputs to each selector 73-2 to 73-4.

Each of the selectors 73-1 to 73-4 selects one of the two inputs according to the corresponding one of the selection information items SEL00 to SEL11 and outputs the selected data item to the corresponding one of registers 81-1 to 81-4. As mentioned above the same data item from one of the terminals 72-1 to 72-4 is input as two inputs to the corresponding one of the first-column selectors 73-1 to 73-4. Therefore, the first-column registers 81-1 to 81-4 store 0, 0, 1, and 1, respectively.

Other selectors and registers are arranged in the same manner as those described above; the selectors and registers are arranged in n columns (four columns in the example shown in FIG. 16). That is, in the second column, selectors 74-1 to 74-4 and registers 82-1 to 82-4 are provided. Outputs from first-column registers 81-1 and 81-2 are supplied to the selectors 74-1 and 74-3 in the second column. Outputs from first-column registers 81-3 and 81-4 are supplied to second-column selectors 74-2 and 74-4. Each of the second-column selectors 74-1 to 74-4 performs processing such as to select one of the two inputs according to the value of the corresponding one of the selection information items SEL00 to SEL11 and to output the selected data item to the corresponding one of the second column registers 82-1 to 82-4. For example, register 74-1 selects the output of register 81-1 when selection information item SEL00 is 0, selects the output of register 81-2 when selection information item SEL00 is 1, and outputs the selected data item to register 82-1. The third and fourth column selectors and registers operate in a similar manner.

Outputs from registers 84-1 to 84-4 in the final column are input to a four-input one-output selector 85. State metrics SM00 to SM11 output from the state metric storages 66-1 to 66-4 shown in FIG. 14 are input to a minimum value comparator circuit 88. The minimum value comparator circuit 88 compares the four state metrics and selects the smallest of them. The minimum value comparator circuit 88 outputs data 00 if the state metric SM00 is the smallest, data 01 if the state metric SM01 is the smallest, data 10 if the state metric SM10 is the smallest, and data 11 if the state metric SM11 is the smallest. The selector 85 selects the output of the register 84-1 when the input from the minimum value comparator circuit 88 is 00, the output of the register 84-2 when the input from the minimum value comparator circuit 88 is 01, the output of the register 84-3 when the input from the minimum value comparator circuit 88 is 10, and the output of the register 84-4 when the input from the minimum value comparator circuit 88 is 11. The output from the selected register is output by selector 85 as a decoding result through a terminal 86. The sequence of outputs from terminal 86 represents the reproduced information.

The above-described connections in the path memory 65 provide outputs corresponding to the state diagram of FIG. 11. The fixed values (0 and 1) at terminals 72-1 to 72-4 represent possible decoded information items. The values which will propagate through the matrix of selectors and registers will depend on the values of selection information SEL00 through SEL11. Those values in turn depend on the values of the state metrics and branch metrics during each clock cycle as discussed above. In effect, the data items which appear at the final registers 84-1 through 84-4 are associated with different possible paths through the trellis or sequence of states of the convolutional encoder. The data item corresponding to the path with the maximum likelihood is selected from the four data items stored in registers 84-1 through 84-4 of the final column, and the selected item is output as the reproduced information. The selector 85 selects the item corresponding to the state metric minimum value, i.e., the path with the maximum likelihood, at each time point. Stated another way, the Viterbi decoder yields a sequence of reproduced data which represents the most likely sequence of original data input to the convolutional encoder at the transmitter. In choosing the most likely sequence, the decoder selects each bit of the reproduced data on the basis of several bits of transmitted data. This provides substantial coding gain.

The increasing demand for high speed data transmission makes it desirable to extend the digital data transmission system described above from the QPSK implementation to other, more complex modulation systems. In the more complex transmission schemes, each transmitted signal denotes values for more than two bits. Each signal typically includes two components, each component having more than two possible nominal values. Examples of such modulation systems include 16-QAM, 64-QAM, and 256-QAM. In the 16-QAM system, each symbol includes two components, and each component has four possible nominal values, so that any one of 16 possible symbols can be transmitted. Thus, each symbol can denote values for four bits. The 64-QAM and 256-QAM systems use symbol sets with 64 and 256 possible symbols to encode six and eight bits per symbol, respectively. By comparison, in the QPSK system described above, only two bits are encoded in each symbol. The more complex transmission systems offer the possibility of higher data transmission rates. However, it is difficult to use an encoding and decoding strategy with convolutional or punctured convolutional coding and with bit diffusion as described above in combination with a multi-component, multi-value modulation system.

FIG. 17 depicts a data transmitter using 16-QAM. In FIG. 17, sections corresponding to the QPSK transmitter of FIG. 9 are indicated by the same reference numerals. The convolutional encoder 2 and bit erase circuit 3 are identical to those used in the QPSK transmitter, and produce a punctured convolutional code sequences identical to that discussed above. However, the serial-parallel converter 4 of FIG. 17 splits the serial data output from bit erase circuit 3 into four parallel data streams u, v, x, and y. These data items in each undergo bit diffusion processing in bit diffusion circuits 91-1 to 91-4 to yield reordered data u', v', x', and y', which are supplied to a signal point assignment circuit 6. The bit diffusion processing applied to each data sequence is the same as that applied in the bit diffusion circuits 5-1 and 5-2 of FIG. 9. The bit diffusion processing is varied with respect to the data sequences by using different values s for each data sequence.

The signal point assignment circuit 6 assigns input 4-bit data (u', v', x', y') as symbols of the 16-QAM symbol set shown in FIG. 18. In the 16-QAM set, each symbol includes two components I' and Q'. Each component can have any one of four nominal values, and each component denotes values of two bits. Thus, component I' denotes the values of the first and third bits of the 4-bit data, whereas component Q' denotes the values of the second and fourth bits. For example, (I', Q')=$(3/\sqrt{10}, 3/\sqrt{10})$ when (u', v', x', y')=(0, 0, 0, 0), and
(I', Q')=$(3/\sqrt{10}, 1/\sqrt{10})$ when (u', v', x', y')=(0, 0, 0, 1).

The symbols produced by signal point assignment circuit 6 are subjected to symbol diffusion in a symbol diffusion circuit 7 in the same manner as discussed above, and the reordered components I and Q are supplied to a modulator 9 and transmitted by OFDM modulation as discussed above. In other respects, the configuration of the transmitter shown in FIG. 17 is the same as that shown in FIG. 9.

A receiver for the 16-QAM signal from the transmitter of FIG. 17, constructed in a manner analogous to the QPSK receiver of FIG. 13, would have the structure shown in FIG. 19. However, a receiver as shown in FIG. 19 will not operate properly.

In the QPSK system as described above with reference to FIG. 13, each of the signal components I and Q input from the symbol diffusion reversal circuit 33 to the bit diffusion reversal circuits 34-1 and 34-2 represents one bit of the bit-diffused punctured convolutional code message. Therefore, reordering of the I and Q signal components by the bit diffusion reversal circuits, in a manner inverse to the reordering applied by the bit diffusion circuits of the transmitter, will restore the signal components to the same order as the order of the bits in the message before bit diffusion processing. However each of components I and Q in the 16-QAM system represents two bits. In the symbol set or signal point constellation shown in FIG. 18, I includes information of the first and third bits while Q includes information of the second and fourth bits. However, I is one value such as $1/\sqrt{10}$ or $3/\sqrt{10}$, and Q is also such one value. If the stream of I and Q component values is simply divided into four data streams as shown in FIG. 19, each data item in each data stream u', v', x'and y' still represents two bits, rather than a single bit. Applying diffusion reversal processing in circuits 95-1 to 95-4, inverse to the bit diffusion processing applied to single-bit data items by transmitter bit diffusion circuits 91-1 to 91-4 (FIG. 17) will scramble the data; it will not recover the original order. Stated another way, the bit diffusion operation is performed at the transmitter on single-bit data, but the signal component values I and Q represent two bits each. Therefore, the inverse operation cannot be performed on the I and Q component values at the receiver.

The same problem arises in connection with the bit erase and bit insertion operations. Thus, the bit erase circuit 3 of the transmitter in FIG. 17 operates on single bits of the mother code. Operation of the bit insertion circuit 36 to insert dummy data into a stream of two-bit component values will further scramble the data and will not restore the original structure of the data. The result of Viterbi decoding of the output from the bit insertion circuit 36 by the Viterbi decoder 37 would be completely different from the original data.

It would appear that the problems associated with handling component values representing multiple bits could be obviated by recovering the individual bit values at or immediately after the symbol diffusion reversal circuit 33 of the data receiver shown in FIG. 19. Thus, prior to the bit diffusion reversal circuit, the I and Q components of each signal can be evaluated to yield the individual bit values u', v', x' and y'. In such a case, the distances between the coordinates (I, Q) defined by the I and Q components of each received signal and the nominal signal points shown in FIG. 18 are calculated. The received signal is deemed to represent the symbol associated with the closest nominal signal point, and bit values are assigned on the basis of that symbol. For example, a received signal having I and Q coordinates close to coordinates $(-1/\sqrt{10}, 3/\sqrt{10})$ is deemed to represent the symbol having nominal values $(-1/\sqrt{10}, 3/\sqrt{10})$, i.e., 1010 in FIG. 18. The bit values associated with this symbol are assigned to the 4-bit data; u'=1, v'=0, x'=1 and y'=0. The bit values recovered in this manner are single-bit values and can be processed through bit diffusion reversal and bit insertion.

However, such a system makes a "hard" decision as to the value of each bit based on the content of a single received signal. It sacrifices the advantages of noise immunity and coding gain obtained by "soft" decoding, such as the Viterbi decoding discussed above, in which information transmitted in several signals, during several unit times, contributes to the decision made by the receiver as to the most probable value for each bit of the reproduced information.

Similar problems arise in other multi-value, multi-component modulation systems such 64-QAM or 256-QAM. Thus there has been a need for improved receiving apparatus and methods which can accurately receive and decode data transmitted by a multi-value, multi-component modulation system can be accurately decoded.

SUMMARY OF THE INVENTION

One aspect of the present invention provides a data receiver for receiving data which includes a series of received multi-component signals representing symbols selected from a set of possible multi-component, multi-value symbols wherein signal denotes values for more than two bits. Typically, each component denotes values for a plurality of bits. The data receiver includes probability calculation means for calculating, from components of each received signal, probabilities that different possible symbols of the symbol set constituted the transmitted symbol represented by the received signal. The receiver further includes bit metric calculation means for calculating bit metrics for the bits denoted by each received signal. The bit metric calculation means may be arranged to calculate a bit metric for a particular bit from the probabilities calculated by the probability calculation means for those possible symbols which denote a predetermined value of that particular bit. For example, in the 16-QAM system discussed above, the probability calculation means preferably calculates, from the I and Q components of each received signal, the probability that each of the symbols shown in FIG. 18 was transmitted.

The probability that each symbol was transmitted may be calculated as a function of the distance between the coordinates defined by the components of the received signal and the coordinates defined by the nominal component values of each symbol. The bit metric calculation means may be arranged to calculate the sum of the probabilities of all of the symbols denoting the predetermined value for the bit in question. For example, to calculate the bit metric for the first bit in the 16-QAM system, the system may calculate the sum of the probabilities for all of the symbols denoting a first-bit value of 0, i.e., for all of the symbols having I-component values of $1/\sqrt{10}$ or $3/\sqrt{10}$. To calculate the bit metric for the fourth bit, the bit metric calculation means may calculate the sum of the probabilities for all of the symbols denoting a fourth-bit value of 0, i.e., all of the symbols in which the Q-component value is $3/\sqrt{10}$ or $-3/\sqrt{10}$. Other composites of the probabilities, and other functions of the sum of probabilities can be used instead of the simple sum.

Because each bit metric represents a single bit of transmitted data, the bit metrics can be handled and subjected to processes such as bit diffusion reversal and bit insertion inverse to the bit diffusion and bit erasure processes applied to single-bit data at the transmitter. The receiver may include means for forming sequences of bit metrics and reordering the bit metrics so as to reverse a bit diffusion operation applied at the transmitter. The receiver may further include means for inserting dummy values into a sequence of bit metrics, thereby reversing a bit erasure operation at the transmitter. However, the bit metrics are not "hard" 1 or 0 values for individual bits. Rather, the bit metric represents the probability that the transmitted symbol included the predetermined value for that particular bit 0 in the examples given above. The bit metrics are real number values, similar to the real values which are propagated through the various stages of the QPSK receiver and presented to the Viterbi decoder as discussed above with reference to FIG. 13. These real values can be used in a "soft" decoding scheme, such as Viterbi decoding, in which the receiver decides on the most probable value of each bit in the reproduced information based on information contained in several bits sent through the transmission channel. Thus, the receiver preferably is adapted to receive signals representing transmitted data encoded in a convolutional code, and has decoding means including means for deconvoluting inverse to the convolutional code. The means for deconvoluting preferably includes means for deconvoluting according to a most-likely path decoding scheme such as a Viterbi decoder.

As mentioned above, functions of the sum of probabilities other than the sum itself may be employed. For example, the bit metric may be calculated as the product of −1 and the logarithm of the aforementioned sum of probabilities. According to a further embodiment of the invention, the bit metric calculation means may be operative to calculate a first sum representing the probabilities of transmission of all of the possible symbols in the symbol set and may be arranged to calculate a second sum including only the probabilities of transmission of the symbols having a component denoting the predetermined value of the bit in question. The bit metric calculation means may be arranged to obtain the bit metric for the particular bit by dividing the second sum by the first sum. As further explained below, the quotient so obtained is the value of the conditional posterior probability that the transmitted symbol denoted the predetermined value of the particular bit.

A data receiver according to a further aspect of the present invention is also adapted to receive the multi-component signals representing symbols selected from a set of possible symbols in a multi-component, multi-value symbol set. A receiver according to this aspect of the invention includes a memory having stored therein a set of bit metrics for bits having predetermined values in the transmitted signal. Different bit metrics are stored at different addresses in the memory. The receiver according to this aspect of the invention also includes reading means for selecting one or more addresses in the memory for each received signal based on the components of that received signal and reading out of the memory the bit metric stored at each selected address. Preferably, the reading means and the stored set of bit metrics are arranged so that, for any received signal, the bit metric read out from the memory will be substantially equal to the bit metric found by calculating, from the received signal, probabilities that different symbols were transmitted and calculating a bit metric from the calculated probabilities for those symbols having a component denoting the predetermined value of the bit. Thus, preferred receivers according to this aspect of the invention derive the bit metrics by use of a "lookup table" approach rather than by direct calculation, but arrive at substantially the same values of the bit metrics as used in the above-mentioned aspect of the invention.

Further aspects of the present invention provide methods of receiving multi-component, multi-value signals representing symbols of a multi-component, multi-value symbol set. The method may include the steps of calculating, from the components of each received signal, probabilities that different possible symbols constituted the transmitted symbol and calculating bit metrics for the bits denoted by the received signal from the probabilities calculated for those possible symbols denoting the predetermined value of the bit. The steps of calculating the probabilities may be performed by determining the distance between the coordinates defined by the components of the received signal and the coordinates defined by the nominal component values of each symbol. The step of calculating the bit metrics may be performed by calculating a sum of the probabilities for those symbols denoting a predetermined value of a bit, as discussed above in connection with the receiver. Other methods according to other aspects of the invention include the steps of selecting at least one address in a memory for each received signal based upon the components of the signal and reading out one or more bit metrics stored at the selected address or addresses in the memory. As discussed above in connection with the receiver, different bit metrics are stored at different addresses in the memory, so that different received signals having different components will cause different bit metrics to be read out of the memory. The arrangement of the stored bit metrics in the memory, and the way in which the address is selected based upon the received components, desirably are selected so that the bit metrics read out from the memory will be equivalent to those arrived at by calculation.

Methods in accordance with the foregoing aspects of the invention desirably further include the steps of processing the bit metrics and recovering reproduced data from the processed bit metrics. Most preferably, the bits represented by the received signals include transmitted data which constitutes the original data encoded in a convolutional code. The processing step most preferably includes the step of deconvoluting the bit metrics in a manner inverse to the convolutional code. The deconvoluting step desirably is performed so as to provide a "soft" or most-likelihood decoding, in which the value of each bit in the reproduced data depends upon the value of several bits in the transmitted data. The processing step may include the steps of forming one or more streams of bit metrics and subjecting the bit metrics streams to bit diffusion reversal processing, bit insertion processing or both. As discussed above in connection with the apparatus, the methods allow the use of multi-value, multi-component transmission schemes, while maintaining all of the advantages afforded by bit diffusion, bit erasure and soft decoding.

The foregoing and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
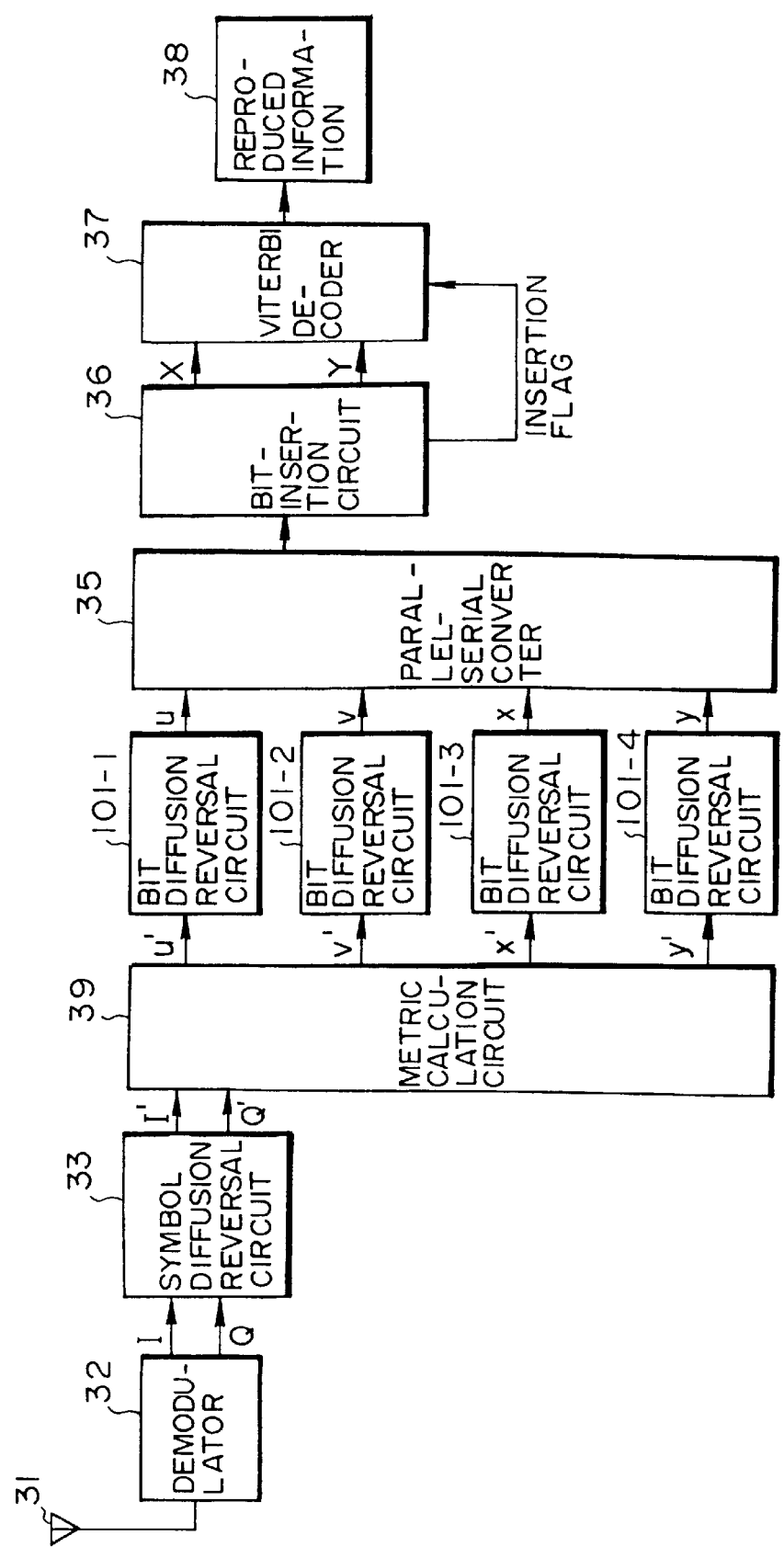
FIG. 1 is a block diagram showing the configuration of a data receiver according to one embodiment of the present invention.

FIG. 1 shows a receiver in accordance with one embodiment of the invention.

Figure 13:
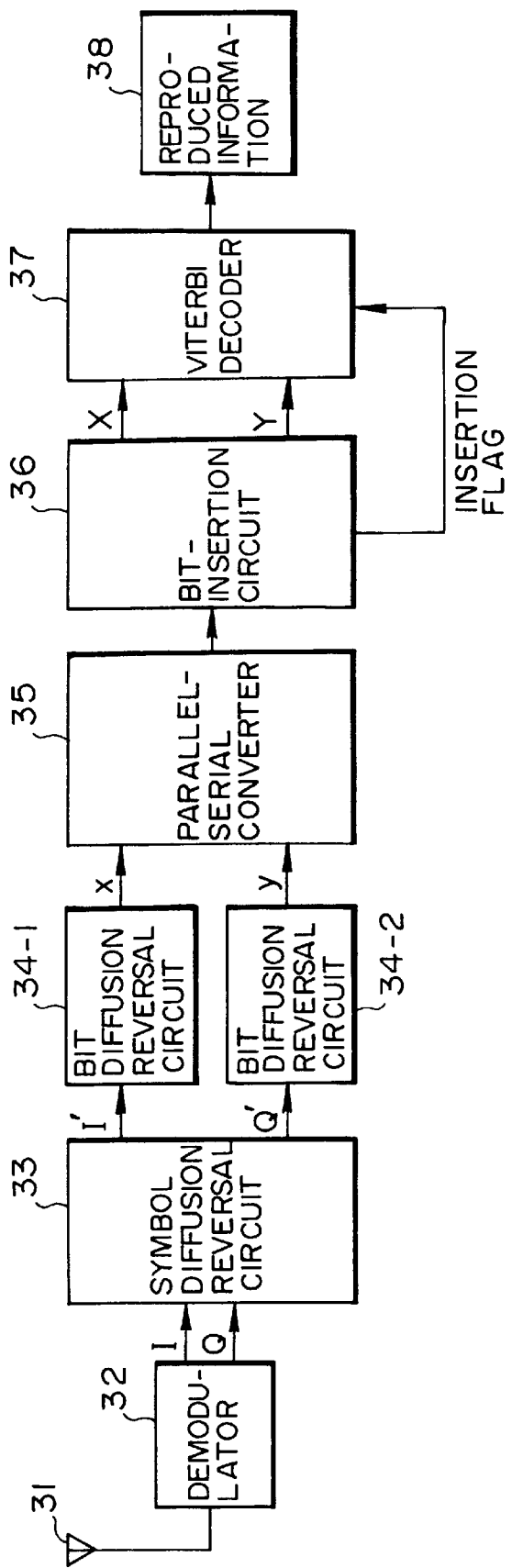
FIG. 13 is a block diagram showing the configuration of a conventional QPSK data receiver.
Figure 17:
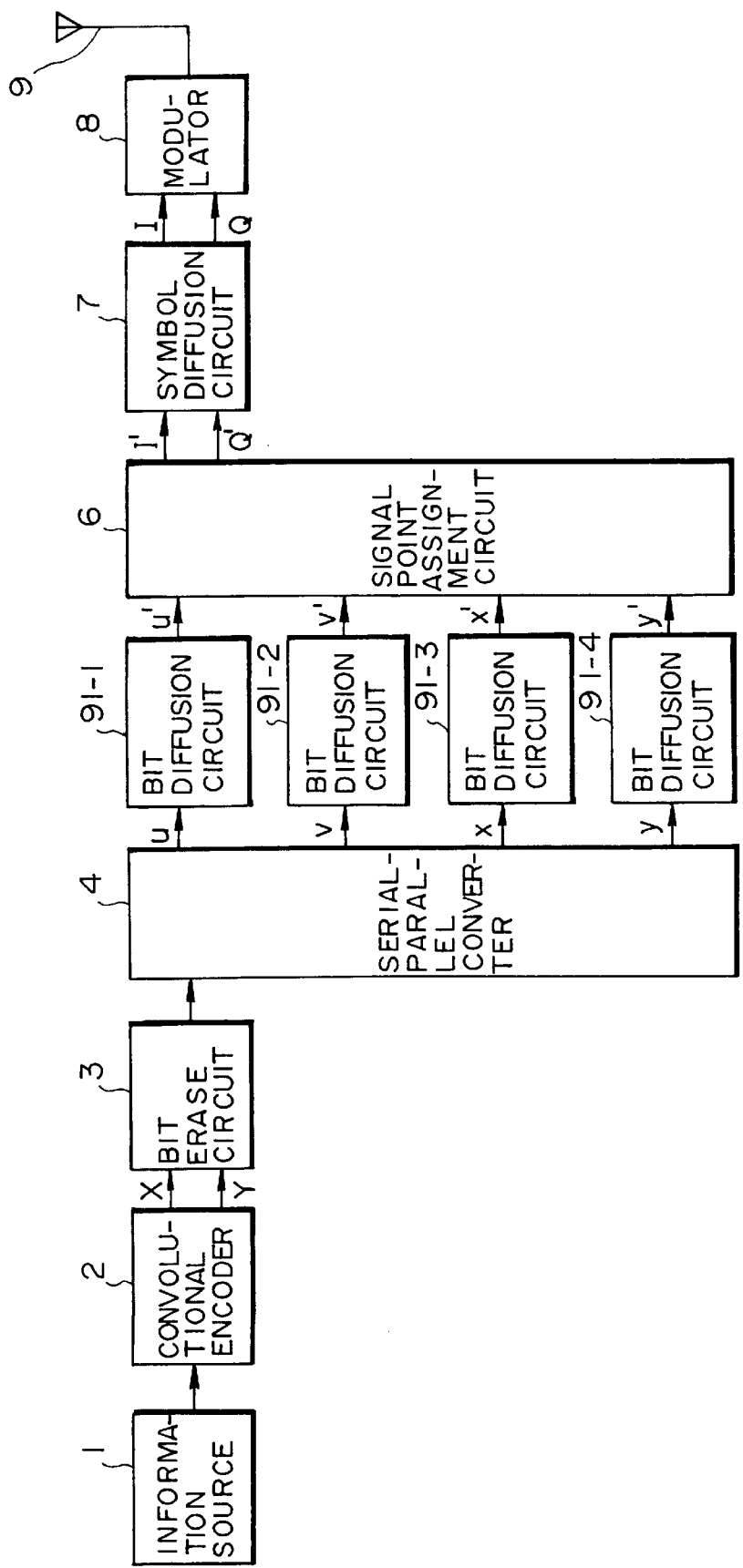
FIG. 17 is a block diagram showing the configuration of an example of a data transmitter using 16-QAM.

This receiver is arranged to receive data transmitted by the transmitter shown in FIG. 17. In FIG. 1, sections corresponding to those of the conventional data receiver shown in FIG. 13 are indicated by the same reference numerals. Those features not discussed below are the same as the corresponding features of the receiver shown in FIG. 13. The receiver includes an antenna 31 and demodulator 32 for recovering multicomponent signals having I and Q components from a transmission path, and passing the I and Q component values to a symbol diffusion reversal circuit 33. The symbol diffusion reversal circuit is arranged to perform processing inverse to that in the symbol diffusion circuit 7 of the transmitter (FIG. 17). As discussed above, this reversal process restores the received signals to the order which the symbols had before processing in symbol diffusion circuit 7. The symbol diffusion reversal circuit outputs the reordered I and Q signal components I' and Q' to a bit metric calculation circuit 39.

Figure 2:
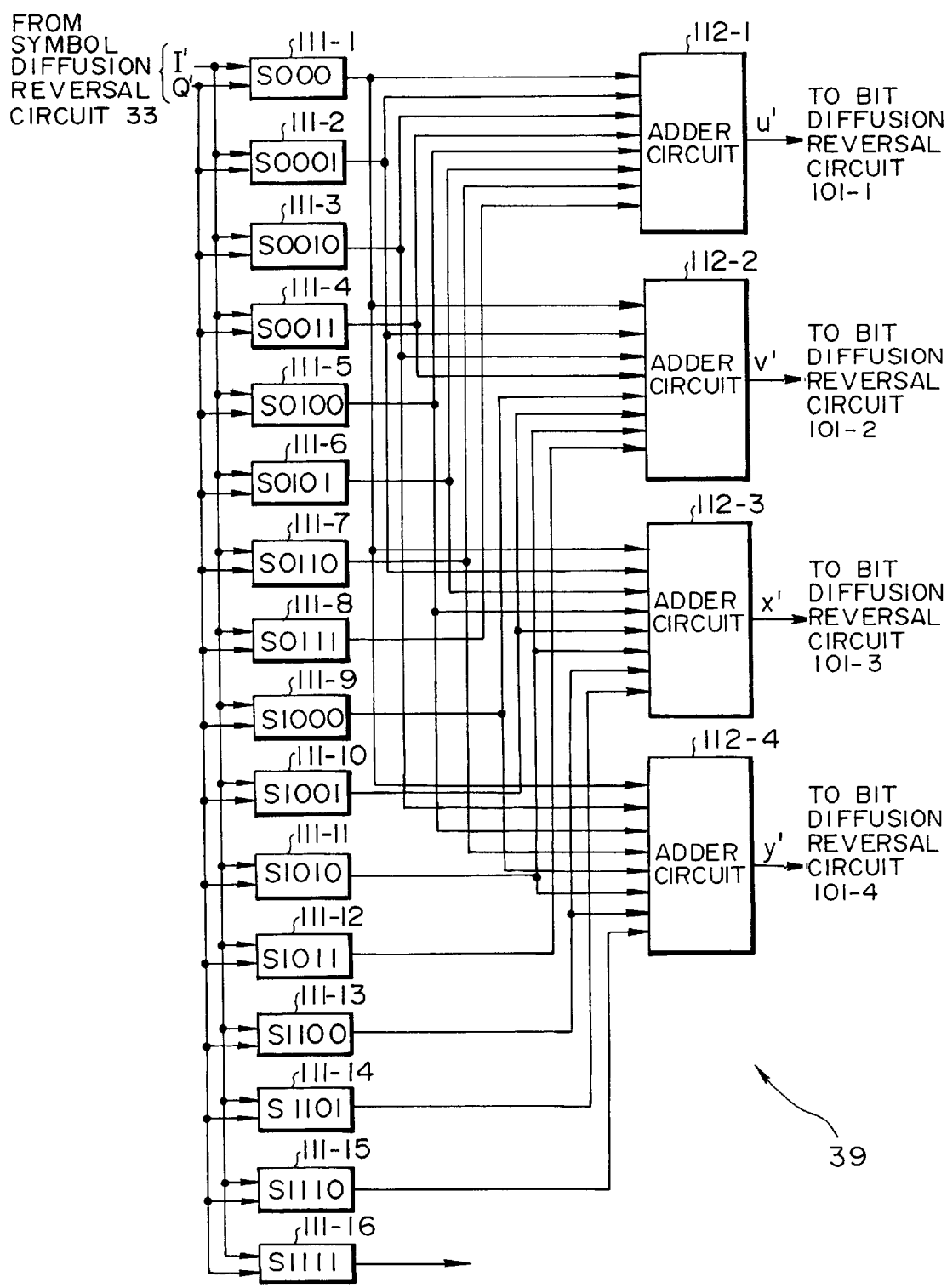
FIG. 2 is a block diagram showing the configuration of an example of the metric calculation circuit shown in FIG. 1.
Figure 18:
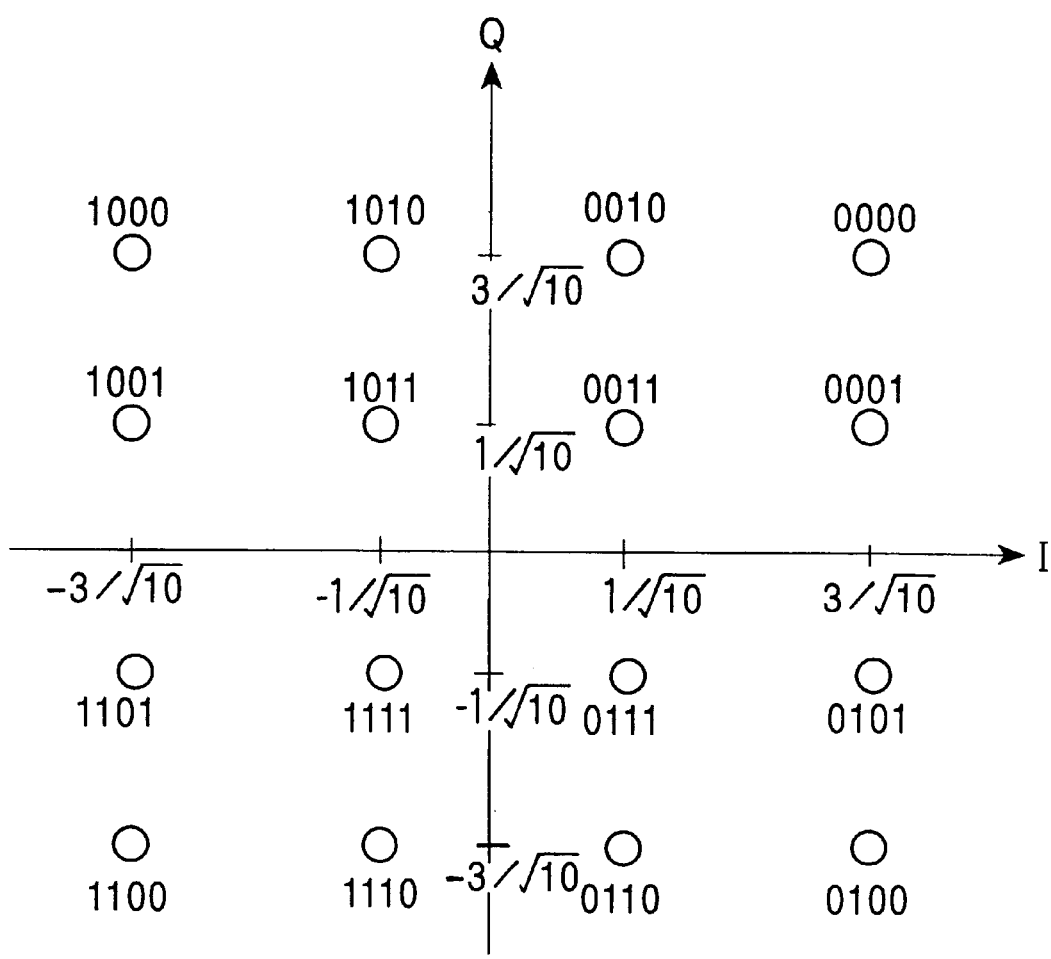
FIG. 18 is a diagram showing a symbol set of 16-QAM.
Figure 19:
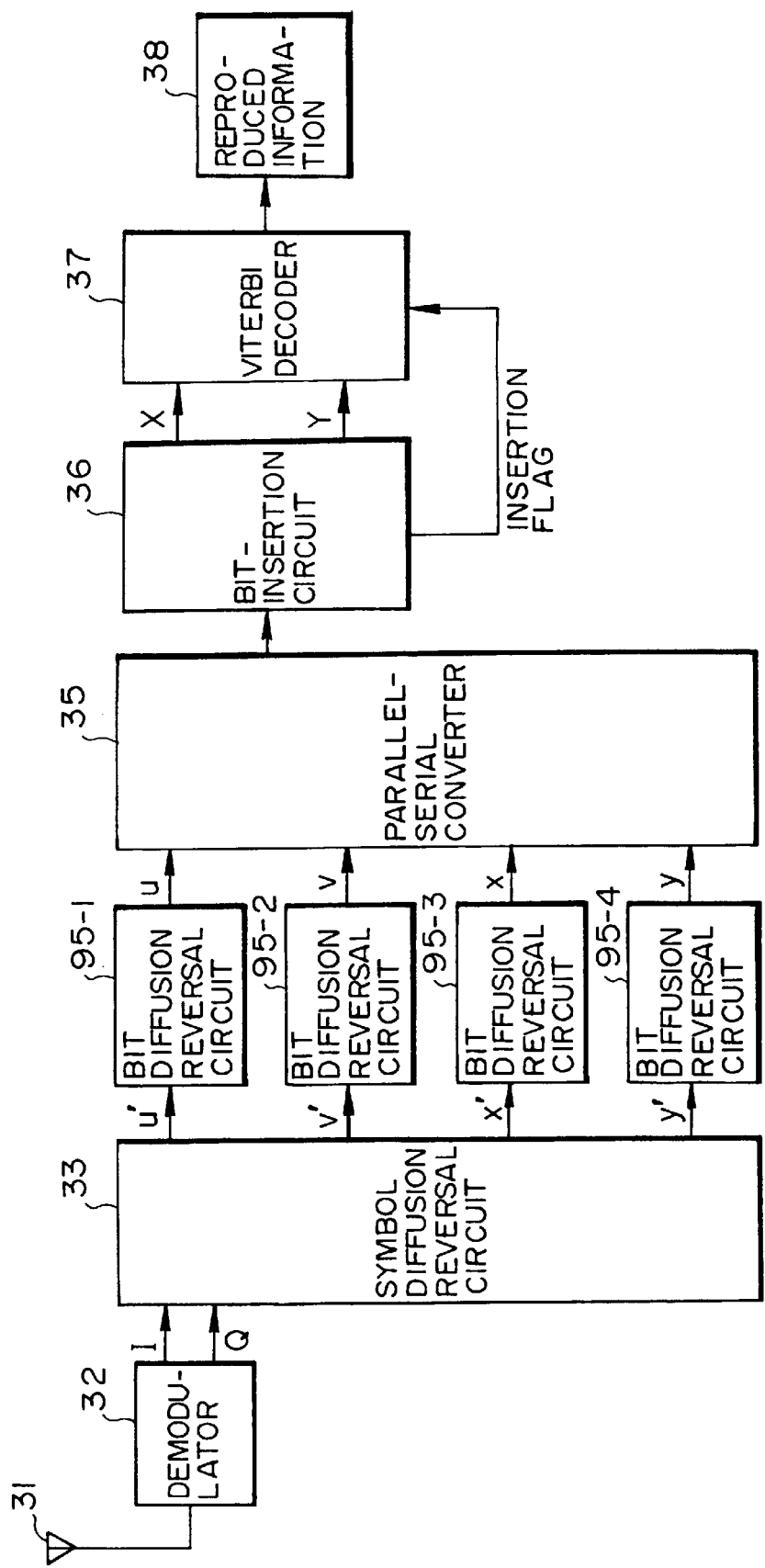
FIG. 19 is a diagram showing the configuration of a hypothetical data receiver for receiving data transmited by the transmitter shown in FIG. 17.

The bit metric calculation circuit 39 is arranged to calculate bit metrics from the supplied I and Q signal components I' and Q' with respect to the first to fourth bits, denoted by each received signal. The configuration of metric calculation circuit 39 is shown in FIG. 2. I' and Q' signals supplied from the symbol diffusion reversal circuit 33 are input to n probability calculation circuits 111-1 to 111-n, as shown in FIG. 2. In this case, the number n is 16. That is, because signal point assignment processing at the transmitter was performed in accordance with the 16-QAM symbol set, each received signal represents one of the 16 possible symbols in the 16-QAM symbol set shown in FIG. 18.

The probability calculation circuit 111-1 calculates P(S0000∩R), i.e., the posterior probability of transmission of symbol S0000 corresponding to 0000 in the 16-QAM system and reception of received signal R with the component values I, Q of the signal being processed.

The probability calculation circuit 111-2 calculates P(S0001∩R), i.e., the posterior probability of transmission of symbol S0001 corresponding to 0001 in the 16-QAM system and reception of received signal R.

The probability calculation circuit 111-3 calculates P(S0010∩R), i.e., the posterior probability of transmission of symbol S0010 corresponding to 0010 in the 16-QAM system and reception of received signal R.

The posterior probabilities are calculated in the same manner with respect to the other 16-QAM symbols. Thus, sixteen posterior probabilities in all are obtained as calculation results. Various calculation methods are conceivable for calculation in the probability calculation circuits 111-1 to 111-16 according to transmission channels. For example, assuming a Gaussian channel, the probability may be calculated in the probability calculation circuit 111-1 as follows.

$$P(S0000 \cap R) = (1/(2\pi)1/2\sigma)\exp(-(\|S0000-R\|^2)/(2\sigma^2)) \quad (3)$$

In this equation, σ represents the square root of ½ of noise power in the transmission channel. That is, $2\sigma^2$ represents noise power in the transmission channel. ∥S0000–R∥ is the Euclidian distance between symbol S0000 and received signal R. The value of σ used by the receiver may be preset when the receiver is constructed, based on the expected characteristics of the transmission channel. Alternatively, the receiver can be arranged to adapt itself to the conditions of the transmission channel, as by trying various values of σ and testing for errors in the resulting data. However, since the value of σ is the same for all of the probability calculations for individual symbols, the value of a does not influence the results. Therefore, a can be omitted in the receiver; i.e., σ can be assigned an arbitrary value of 1 in equation (3). Probabilities can be calculated in the same manner in the probability calculation circuits 111-2 to 111-16.

In this embodiment, the bit metrics are calculated as discussed below by summing the probabilities that symbols denoting 0 values for each bit were transmitted. Therefore, the probability that symbol S1111 was transmitted does not enter into the calculation of the bit metrics. Probability calculation circuit 111-16 for calculating posterior probability P(S1111∩R) is not particularly necessary and may be removed.

An adder circuit 112-1 receives outputs from the probability calculation circuits 111-1 to 111-8, i.e., the probabilities with respect to the possible symbols S0000, S0001, S0010, S0011, S0100, S0101, S0110 and S0111 denoting a value of 0 as the first bit. Adder circuit 112-1 calculates the sum of these probabilities, and outputs the calculated value as a bit metric for the first bit u' denoted by the received signal. The bit metrics calculated by adder circuit 112-1 are output to a bit diffusion reversal circuit 101-1 (FIG. 1).

Similarly, a second adder circuit 112-2 receives outputs from the probability calculation circuits 111-1 to 111-4, and 111-9 to 111-12, i.e., the probabilities calculated with respect to symbols S0000, S0001, S0010, S0011, S1000, S1001, S1010 and S1011 denoting a value of 0 as the second bit. Adder circuit 112-2 calculates the sum of these probabilities, and outputs the calculated value as a bit metric for the second bit v' denoted by the received signal. The bit metrics calculated by adder circuit 112-2 are output to a bit diffusion reversal circuit 101-2.

A third adder circuit 112-3 receives outputs from the probability calculation circuits 111-i (i=1, 2, 5, 6, 9, 10, 13, 14), and thus receives the probabilities calculated with respect to symbols S0000, S0001, S0100, S0101, S1000, S1001, S1100 and S1101 denoting 0 as the third bit. Adder circuit 112-3 calculates the sum of these probabilities, and outputs the sum as a bit metric for the third bit x' denoted by the received signal. The bit metrics calculated by adder circuit 112-3 are supplied to a bit diffusion reversal circuit 101-3.

A fourth adder circuit 112-4 receives outputs from the probability calculation circuits 111-i (i=1, 3, 5, 7, 9, 11, 13, 15), and thus receives the probabilities calculated with respect to the symbols denoting 0 as the fourth bit, i.e., symbols S0000, S0010, S0100, S0110, S1000, S1010, S1100, and S1110. The fourth adder circuit calculates the sum of these probabilities, and outputs the calculated value as a bit metric for the fourth bit y' denoted by the received signal. The bit metrics from the fourth adder circuit 112-4 are supplied to a bit diffusion reversal circuit 101-4.

The bit metric calculation circuit of FIG. 2 calculates P(bi=0∩R), i.e., the posterior probability of transmission of a symbol in which the bit i is 0 and reception of received signal R(I, Q). That is, the metric calculation circuit 39 calculates metrics for the first through fourth bits denoted by each received signal, and outputs:

u' representing metric P(b1=0∩R) for the first bit;
v' representing metric P(b2=0∩R) for the second bit;
x' representing metric P(b3=0∩R) for the third bit; and
y' representing metric P(b4=0∩R) for the fourth bit.

Each metric is calculated in accordance with the following equation:

$$P(bi=0 \cap R) = (1/16)\Sigma P(S_j \cap R)$$

P(Sj∩R) represents the posterior probability of transmission of symbol $S_j$ in which the bit i is 0 and reception of received signal R, and Σ P(S$_j$∩R) represents the sum of the posterior probabilities P(S$_j$∩R) of all symbols S$_j$ which denote a value of 0 for bit i. As noted above, the first adder 112-1 computes the sum of the posterior probabilities for all symbols which denote a first bit value of 0, and thus computes ΣP(S$_j$∩R) for bit 1. The exact value of P(b1=0∩R) is the quotient of division of this sum by 16. Likewise, each of the other adder circuits produces a value which is 16 times the exact value of P(bi=0∩R) for i=2, 3 or 4. Because the values of all of the bit metrics are multiplied by the same coefficient (16), this does not substantially affect the results achieved.

The bit metrics calculated by bit metric calculation circuit 39 are supplied to the bit diffusion reversal circuits 101-1 through 101-4. The sequence of bit metrics u' representing the first bits of the received signals are supplied to the first bit diffusion reversal circuit 101-1, and the sequences of bit metrics v', x' and y' representing the other bits are supplied to the corresponding bit diffusion reversal circuits 101-2, 101-3 and 101-4. Each bit diffusion reversal circuit 101-i (i=1 to 4) is arranged to reorder the bit metrics in a manner inverse to the bit reordering performed by the corresponding bit diffusion circuit 91-i of the transmitter (FIG. 17).

The reordered sequences of bit metrics u,v,x and y for the first to fourth bits resulting from bit diffusion reversal processing are input to a parallel-serial converter 35. The parallel-serial converter 35 converts the four data sequences into one data sequence by an operation reverse to that of the serial-parallel converter 4 shown in FIG. 17, and outputs the converted data to a bit insertion circuit 36.

Bit insertion circuit 36 performs the operation inverse to that performed by the bit erase circuit 3 shown in FIG. 17. That is, the erase map shown above:

X: 10
Y: 11 is used to insert an arbitrary dummy data item (0 in this case) in the data sequence, and the data sequence is split into two sequences X and Y. The data input to insertion circuit 36 is provided by parallel-serial converter 35 in the order u1, v1, x1, y1, u2, v2, x2, y2 Dummy data items are inserted periodically at the positions immediately before every third bit in the data sequence, so that u1, 0, y1, 0, x2, ... are output as data X in this order, and
v1, x1, u2, v2, y2, ... are also output as data Y in this order.

Data sequences X and Y are output from the bit insertion circuit 36 to a Viterbi decoder 37. Also, the bit insertion circuit provides a flag indicating the position of insertion of each dummy data item is supplied to the Viterbi decoder 37.

Figure 3:
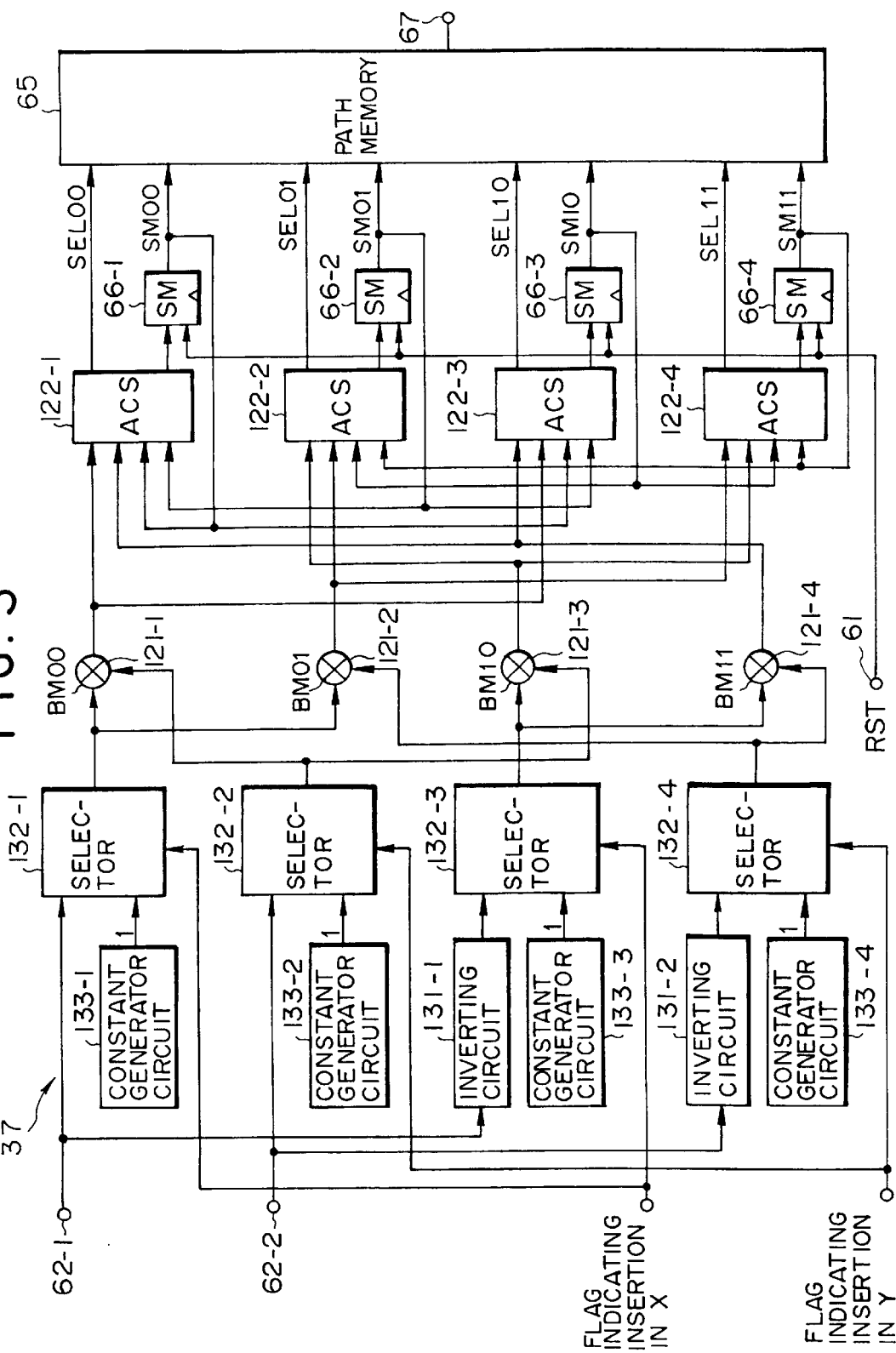
FIG. 3 is a block diagram showing the configuration of an example of the Viterbi decoder shown in FIG. 1.

FIG. 3 shows the configuration of an example of the Viterbi decoder 37. In this example, the output X (the value corresponding to metric u for the first bit or metric x for the third bit) from bit insertion circuit 36 is input to an input terminal 62-1 while the output Y (the value corresponding to metric v for to the second bit or metric y for the fourth bit) from the bit insertion circuit 36 is input to an input terminal 62-2.

The values X input to the input terminal 62-1 are input to a selector 132-1 and to an inverting circuit 131-1. All the values X are inverted by the inverting circuit 131-1 and are thereafter input to a selector 132-3. The values Y input to the input terminal 62-2 are input to a selector 132-2 and to an inverting circuit 131-2. All the values Y are inverted by the inverting circuit 131-2 and are thereafter input to a selector 132-4.

The selector 132-1 is supplied with the value 1 which is output from a constant generator circuit 133-1 and with the value X from the input terminal 62-1. When a flag indicating insertion in X and sent from the bit insertion circuit 36 is input to the selector 132-1, the selector 132-1 selects the value I generated by the constant generator circuit 133-1. When no flag indicating insertion in X is input, the selector 132-1 selects the value X. The selector 132-1 outputs the selected value to multiplier circuits 121-1 and 121-2.

The selector 132-2 is supplied with the value 1 which is output from a constant generator circuit 133-2 and the with the value Y from the input terminal 62-2. When a flag indicating insertion in Y and sent from the bit insertion circuit 36 is input to the selector 132-2, the selector 132-2 selects the value 1 generated by the constant generator circuit 133-2. When no flag indicating insertion in Y is input, the selector 132-2 selects the value Y. The selector 132-2 outputs the selected value to multiplier circuits 121-1 and 121-3.

The selector 132-3 is supplied with the value 1 which is output from a constant generator circuit 133-3 and the value obtained by inverting the value X, output by the inverting circuit 131-1. When a flag indicating insertion in X and sent from the bit insertion circuit 36 is input to the selector 132-3, the selector 132-3 selects the value 1 generated by the constant generator circuit 133-3. When no flag indicating insertion in X is input, the selector 132-3 selects the inverted X value from inverting circuit 131-1. The selector 132-3 outputs the selected value to multiplier circuits 121-3 and 121-4.

The selector 132-4 is supplied with the value 1 which is output from a constant generator circuit 133-4 and with the value obtained by inverting the bit metric value Y, output by the inverting circuit 131-2. When a flag indicating insertion in Y and sent from the bit insertion circuit 36 is input to the selector 132-4, the selector 132-4 selects the value 1 generated by the constant generator circuit 133-4. When no flag indicating insertion in Y is input, the selector 132-4 selects the inverted Y bit metric value from inverting circuit 131-2. The selector 132-4 outputs the selected value to multiplier circuits 121-2 and 121-4.

The multiplier circuit 121-1 calculates the product of the value supplied from the selector 132-1 and the value supplied from the selector 132-2, and outputs the product as a branch metric BM00. The multiplier circuit 121-2 calculates the product of the value supplied from the selector 132-1 and the value supplied from the selector 132-4, and outputs the product as a branch metric BM01. Similarly, the multiplier circuit 121-3 calculates the product of the value supplied from the selector 132-2 and the value supplied from the selector 132-3, and outputs the product as a branch metric BM10, and the multiplier circuit 121-4 calculates the product of the value supplied from the selector 132-3 and the value supplied from the selector 132-4, and outputs the product as a branch metric BM11.

The output BM00 of the multiplier circuit 121-1 and the output BM11 of the multiplier circuit 121-4 are input to ACS circuits 122-1 and 122-3. The output BM01 of the multiplier circuit 121-2 and the output BM10 of the multiplier circuit 121-3 are input to ACS circuits 122-2 and 122-4.

An output SM00 from a state metric storage 66-1 and an output SM01 from a state metric storage 66-2 are also input to the ACS circuits 122-1 and 122-3. An output SM10 from a state metric storage 66-3 and an output SM11 from a state metric storage 66-4 are also input to the ACS circuits 122-2 and 122-4.

The ACS circuits 122-1 to 122-4 calculate new state metrics from the input branch and state metrics, and output the results of calculation to the state metric storages 66-1 to 66-4, and also output information SEL00 to SEL11 corresponding to selected paths to a path memory 65.

Figure 14:
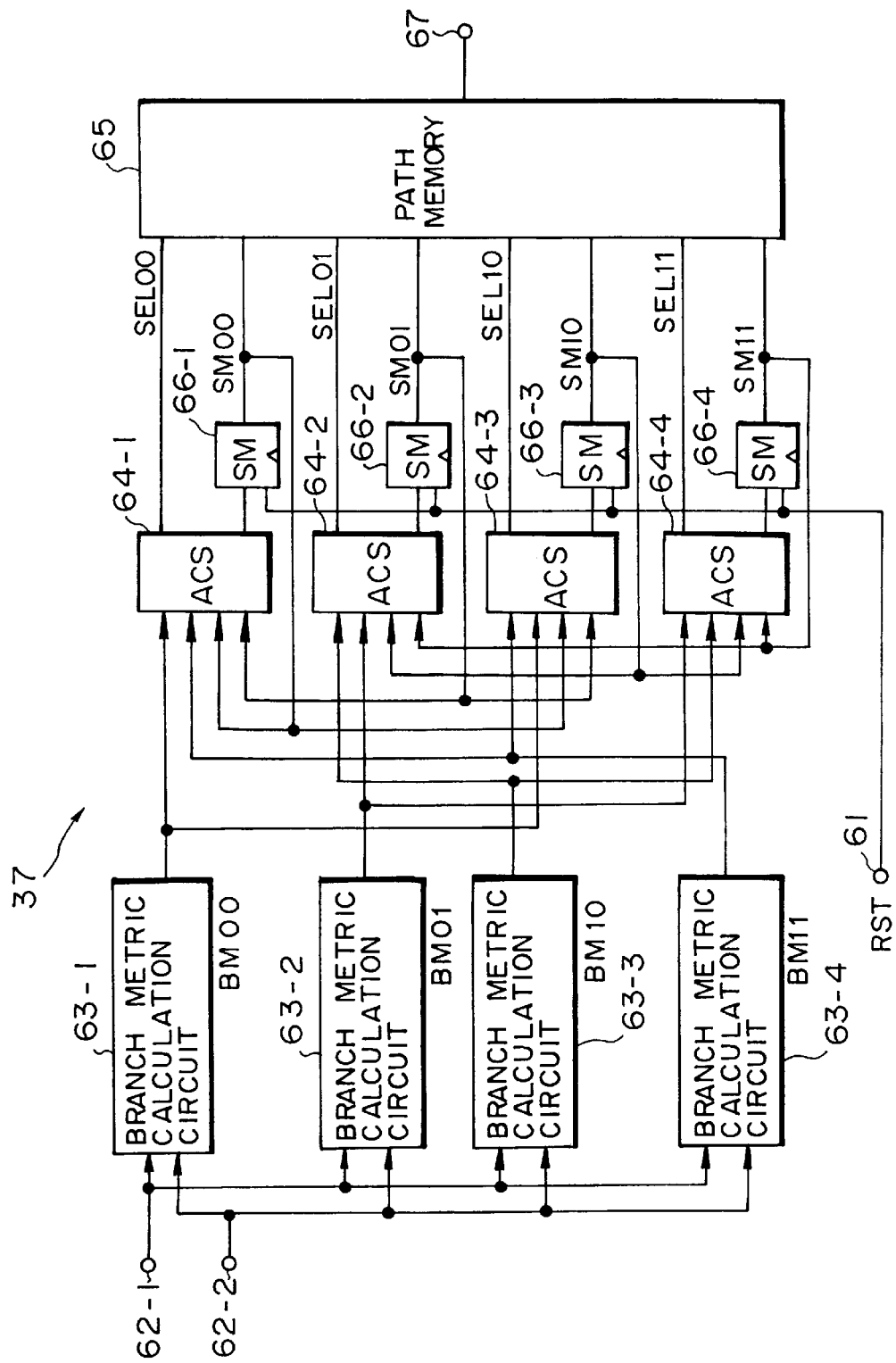
FIG. 14 is a block diagram showing the configuration of an example of the Viterbi decoder shown in FIG. 13.
Figure 15:
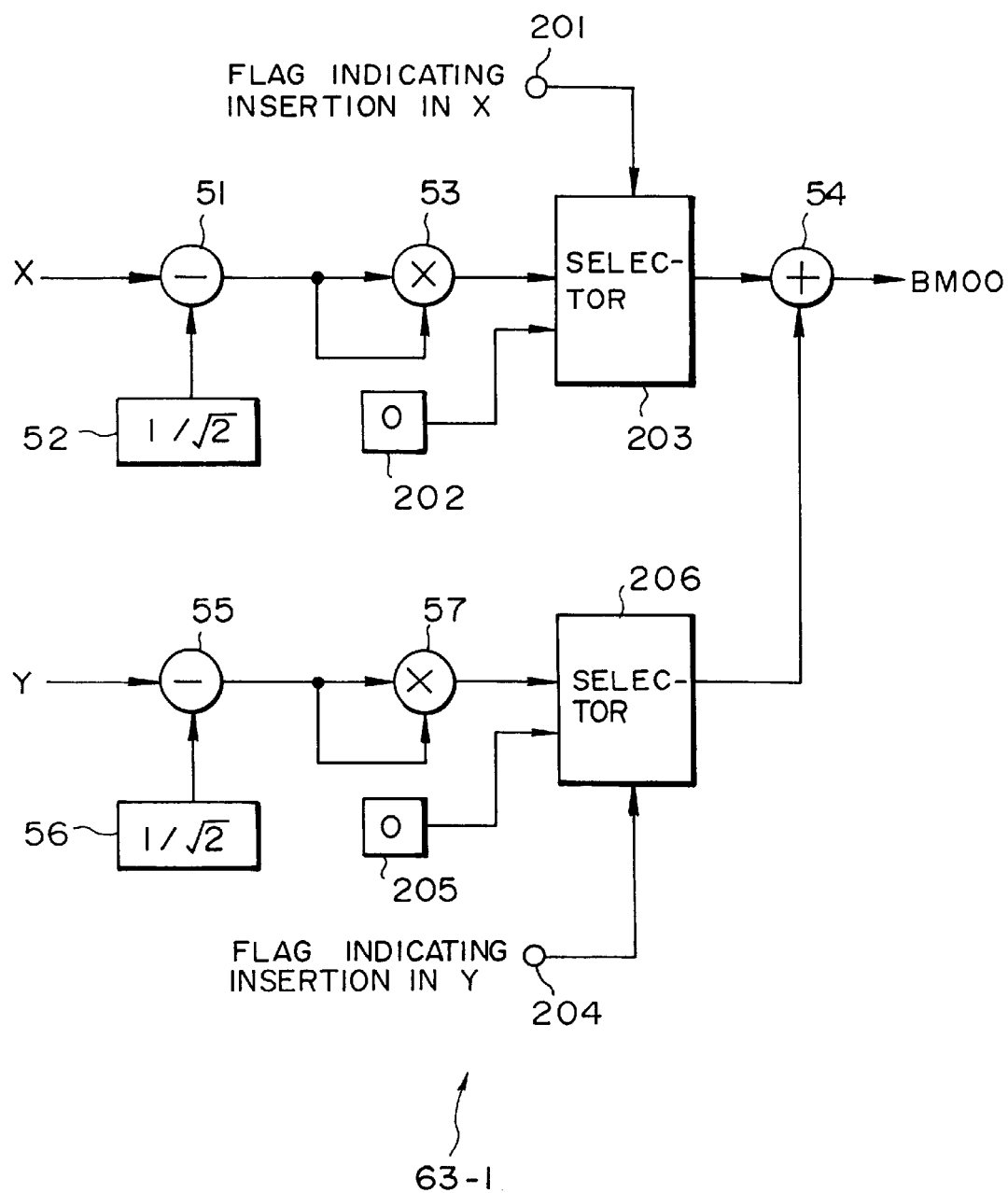
FIG. 15 is a block diagram showing the configuration of an example of the branch metric calculation circuit shown in FIG. 14.
Figure 16:
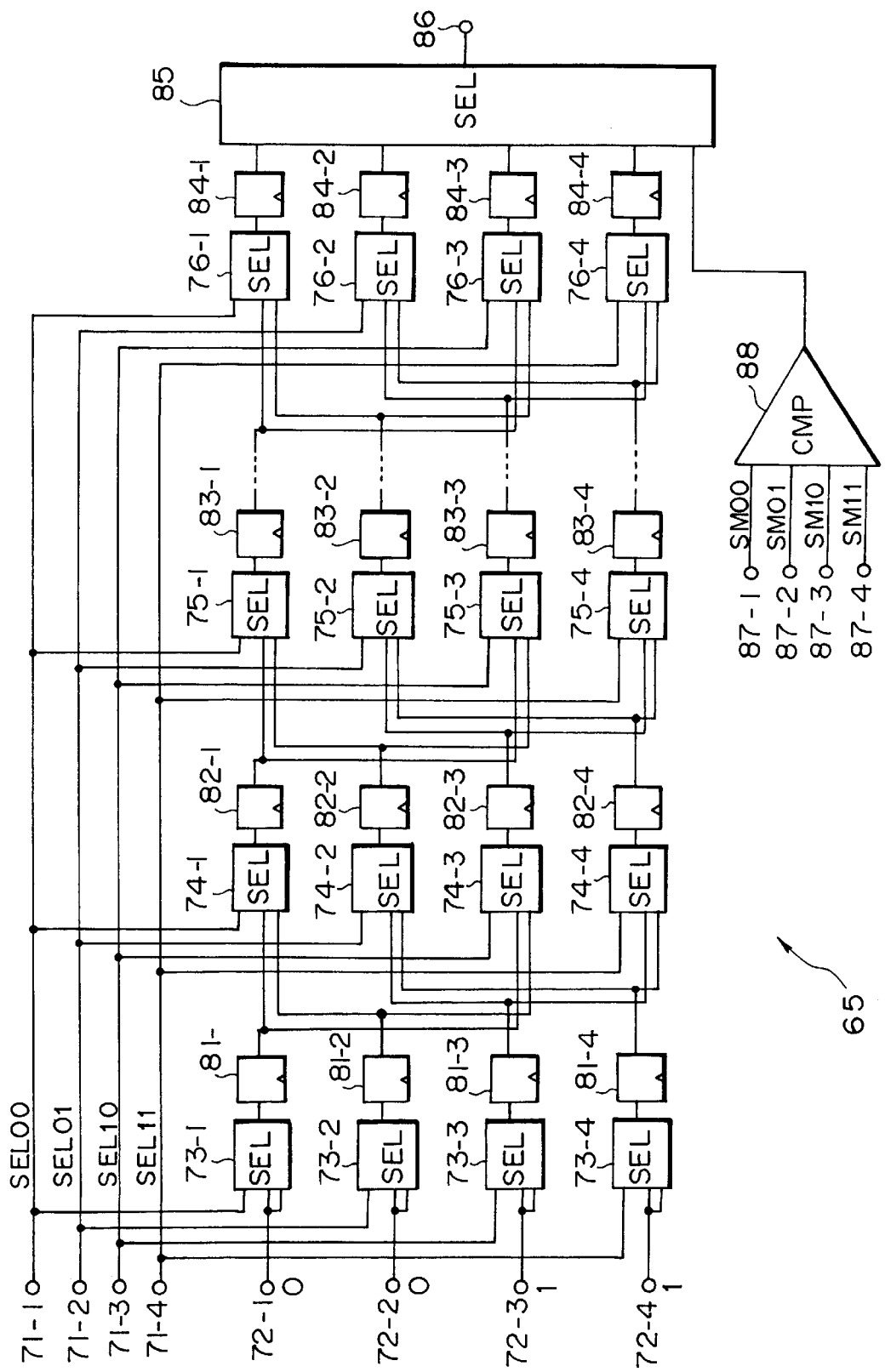
FIG. 16 is a block diagram showing the configuration of an example of the path memory shown in FIG. 14.

In other respects, the configuration of the Viterbi decoder 37 of this embodiment is the same as that shown in FIG. 14. Therefore, no further structural description of it will be given.

The Viterbi decoder 37 performs Viterbi decoding in accordance with the state transition of the convolutional encoder 2 to obtain reproduced information 38. The operation of the Viterbi decoder 37 is as follows:

The selectors 132-1 and 132-3 output the value 1 to nullify the metric probability calculation of dummy data when supplied with a dummy data item inserted in X in the bit insertion circuit 36 and with the flag indicating insertion in X.

Also, the selectors 132-2 and 132-4 output the value 1 to nullify the metric probability calculation of dummy data when supplied with a dummy data item inserted in Y in the bit insertion circuit 36 and with the flag indicating insertion in Y.

Because branch metric calculation by the multiplier circuits 121-1 to 121-4 and state metric calculation by the ACS circuits 122-1 to 122-4 are each performed as multiplication, supplying the value 1 in place of the dummy data item prevents influence by the dummy data item on the result of the metric calculation.

When no dummy data item is inserted in X, the bit metric value X supplied from the bit insertion circuit 36 is supplied to the multiplier circuits 121-1 and 121-2 via the selector 132-1, and the value obtained by inverting the bit metric value X is supplied to the multiplier circuits 121-3 and 121-4.

Similarly, when no dummy data item is inserted in Y, the bit metric value Y supplied from the bit insertion circuit 36 is supplied to the multiplier circuits 121-1 and 121-3 via the selector 132-2, and the value obtained by inverting the bit metric value Y is supplied to the multiplier circuits 121-2 and 121-4.

The multiplier circuit 121-1 calculates the product of the bit metric value X corresponding to the probability that the first bit of the output from the bit insertion circuit 36 is 0 or that the third bit is 0 and the bit metric value Y corresponding to the probability that the second bit is 0 or that the fourth bit is 0 (i.e., the probability that each of the first and second bits is 0, or the probability that each of the third and fourth bits is 0), and outputs the product as branch metric BM00. This branch metric BM00 corresponds to the code output 00 of the convolutional encoder 2.

Similarly, the multiplier circuit 121-2 calculates the product of the bit metric value X corresponding to the probability that the first bit of the output from the bit insertion circuit 36 is 0 or that the third bit is 0 and the value (obtained by inverting the bit metric value Y) corresponding to the probability that the second bit is 1 or that the fourth bit is 1 (i.e., the probability that the first bit is 0 while the second bit is 1, or the probability that the third bit is 0 while the fourth bit is 1), and outputs the product as branch metric BM01. This branch metric BM01 corresponds to the code output 01 of the convolutional encoder 2.

The multiplier circuit 121-3 calculates the product of the value (obtained by inverting the bit metric value X) corresponding to the probability that the first bit of the output from the bit insertion circuit 36 is 1 or that the third bit is 1 and the bit metric value Y corresponding to the probability that the second bit is 0 or that the fourth bit is 0 (i.e., the probability that the first bit is 1 while the second bit is 0, or the probability that the third bit is 1 while the fourth bit is 0), and outputs the product as branch metric BM10. This branch metric BM10 corresponds to the code output 01 of the convolutional encoder 2.

The multiplier circuit 121-4 calculates the product of the value (obtained by inverting the bit metric value X) corresponding to the probability that the first bit of the output from the bit insertion circuit 36 is 1 or that the third bit is 1 and the value (obtained by inverting the bit metric value Y) corresponding to the probability that the second bit is 1 or that the fourth bit is 1 (i.e., the probability that each of the first and second bits is 1, or the probability that each of the third and fourth bits is 1), and outputs the product as branch metric BM11. This branch metric BM11 corresponds to the code output 11 of the convolutional encoder 2.

When a dummy data item inserted in X or Y is supplied, the corresponding one of the selectors 132-1 to 132-4 selects 1 instead of the dummy data item, so that the multiplier circuits 121-1 to 121-4 output as branch metrics the input values which do not correspond to the dummy data item, without changing them. That is, the real bit metric value or inverted bit metric value entering the multiplier circuit is multiplied by 1.

Figure 11:
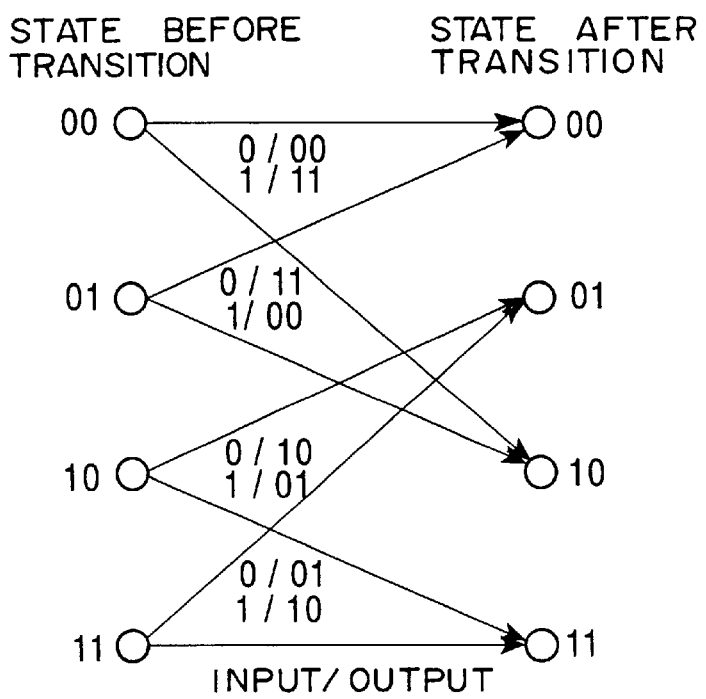
FIG. 11 is a diagram showing state transitions of the convolutional encoder shown in FIG. 10.
Figure 12:
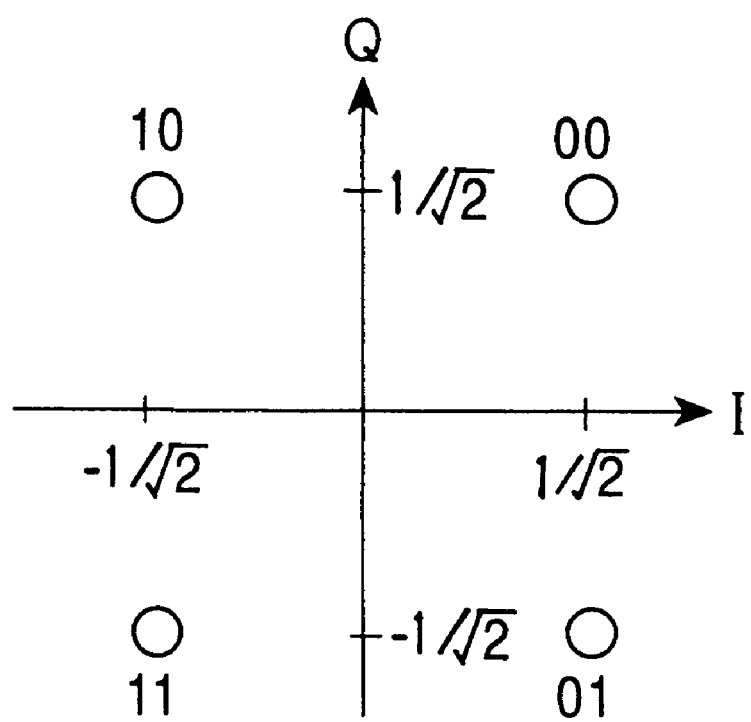
FIG. 12 is a diagram showing a symbol set of QPSK.

The ACS circuit 122-1 performs the following two calculations according to the state transition (FIG. 11) of the convolutional encoder 2.

$$SM00 \times BM00 \qquad (4)$$

$$SM01 \times BM11 \qquad (5)$$

In these expressions, SM00 represents the value of the state metric storage 66-1 one unit time before (i.e., the value left in state metric storage unit 66-1 after processing the last previous set of bit metrics X and Y input at terminals 62-1 and 62-2), SM01 represents the value of the state metric storage 66-2 one unit time before, BM00 represents the result of calculation by the multiplier circuit 121-1, and BM11 represents the result of calculation by the multiplier circuit 121-4.

The ACS circuit 122-1 selects the calculation result with a higher likelihood, i.e., the greater one of the results of the calculations represented by expressions (4) and (5), outputs corresponding selection information SEL00 to the path memory 65, and supplies the greater one of the results of calculations (4) and (5) to the subsequent state metric storage 66-1. The state metric storage 66-1 stores this calculation result. If the result of calculation (4) is greater, SEL00=0 is set. If the result of calculation (5) is greater, SEL00=1 is set. In the former case, the state metric storage 66-1 stores SM00×BM00 as new state metric SM00. In the latter case, the state metric storage 66-1 stores SM01×BM11 as new state metric SM00.

The ACS circuits 122-2 to 122-4 operate in the same manner to calculate new state metrics SM01 to SM11. Except for the above, the operation of the Viterbi decoder 37 is the same as that of the Viterbi decoder 37 shown in FIG. 14 and, therefore, will not further be described.

Figure 4:
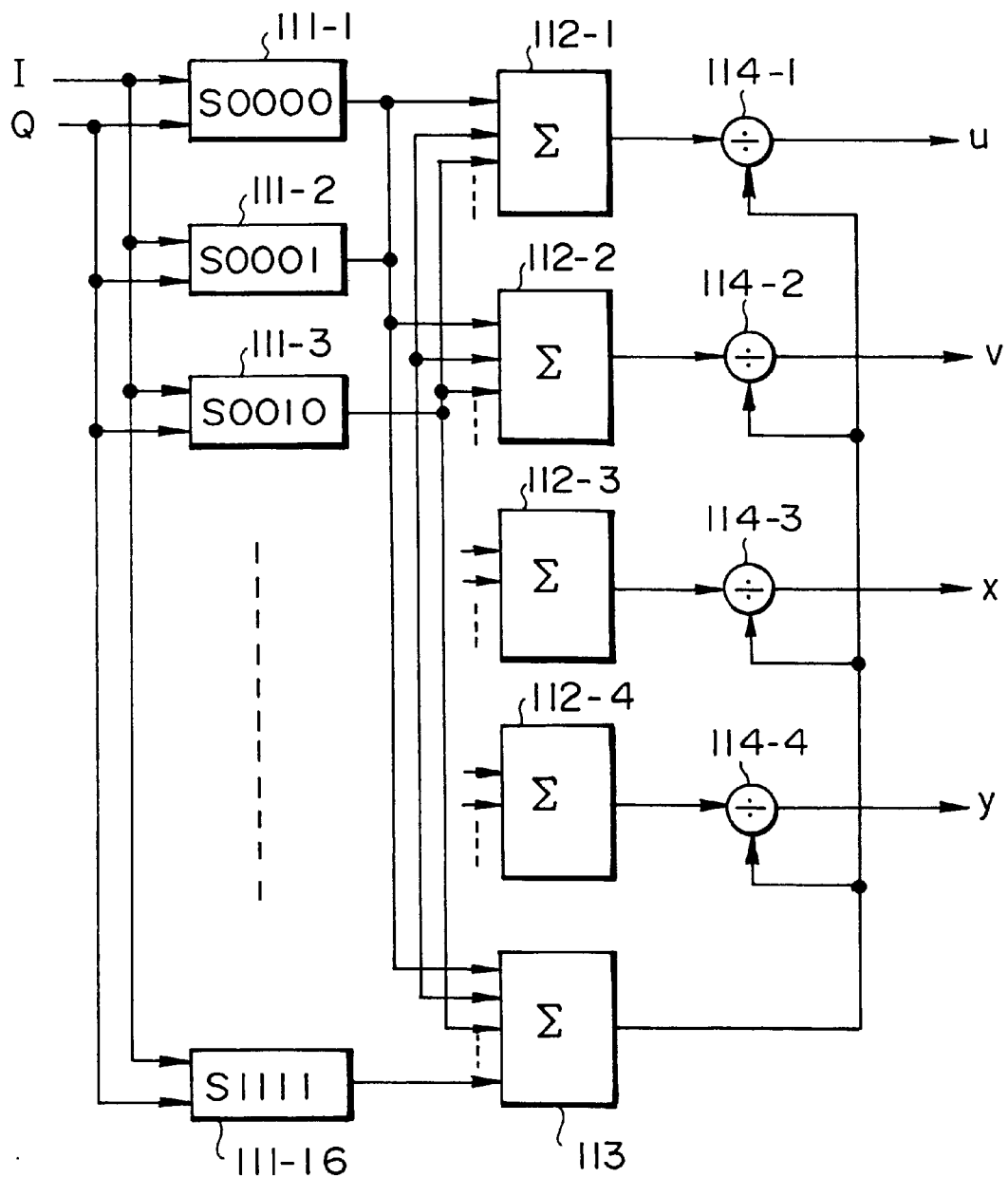
FIG. 4 is a block diagram showing the configuration of another example of the metric calculation circuit shown in FIG. 1.

A further embodiment of the bit metric calculation circuit 39 is depicted in FIG. 4. The bit metric calculation circuit of FIG. 4 can be used instead of the bit metric calculation circuit discussed above with reference to FIG. 2. The circuit of FIG. 4 calculates a bit metric which corresponds to a conditional posterior probability prescribed in the following expression for each bit denoted by each received signal:

$$P(b_i=0|R)=P(b_i=0 \cap R)/P(R) \qquad (6)$$

In this equation, $P(b_i=0|R)$ represents the conditional posterior probability that the bit i (bi) (the first, second, third or fourth bit) denoted by a transmitted symbol is 0 when received signal R(Ir, Qr) is received, P(R) represents the probability of signal R(Ir, Qr) being received, and P(bi=0∩R) represents the probability of transmission of a symbol in which the bit i is 0 and reception of received signal R(Ir, Qr).

Similarly, the conditional posterior probability that the bit i of a transmitted symbol is 1 when received signal R(Ir, Qr) is received can be obtained by the following equation:

$$P(bi=1|R)=P(bi=1\cap R)/P(R) \quad (7)$$

In this equation, P(bi=1|R) represents the conditional posterior probability that bit i of a transmitted symbol is 1 when signal R(Ir, Qr) is received, P(R) represents the probability of signal R(Ir, Qr) being received, and P(bi=1∩R) represents the probability of transmission of a symbol in which the bit i is 1 and reception of signal R(Ir, Qr).

The conditional posterior probability that the bit i of a transmitted symbol is 1 when signal R(Ir, Qr) is received can also be obtained by the following equation:

$$P(bi=1|R)=1-P(bi=0|R) \quad (8)$$

The bit metric calculation circuit of FIG. 4 calculates probabilities for the first through fourth bits constituting each of 16-QAM symbols from the input I component Ir and Q component Qr, and outputs:

u representing metric P(b1=0|R) for the first bit,
v representing metric P(b2=0|R) for the second bit,
x representing metric P(b3=0|R) for the third bit, and
y representing metric P(b4=0|R) for the fourth bit.

Each of the metrics is calculated in accordance with equation (6) shown above. That is, $$P(bi = 0 | R) = P(bi = 0 \cap R)/P(R) \quad (9)$$

$$= ((1/16)\Sigma P(S_j \cap R))/((1/16)\Sigma P(S_k \cap R)) \quad (10)$$

$$= (\Sigma P(S_j \cap R)/(\Sigma P(S_k \cap R)) \quad (11)$$

In this equation, P(Sj∩R) represents the probability of transmission of symbol $S_j$ and reception of received signal R, and ΣP(Sj∩R) represents the sum of the probabilities P(Sj∩R) of all symbols $S_j$ in which the bit i is 0.

On the other hand, P(Sk∩R) represents the probability of transmission of symbol $S_k$ and reception of received signal R, and ΣP(Sk∩R) represents the sum of the posterior probabilities P(Sk∩R) of all symbols $S_k$ defined in the 16-QAM system.

In the bit metric calculation circuit shown in FIG. 4, the probability calculation circuits 111-1 to 111-16 operate in the same was as the corresponding circuits of FIG. 2. Thus, the probability calculation circuit 111-1 of FIG. 4 calculates P(S0000∩R), i.e., the probability of transmission of symbol S0000 corresponding to 0000 in the 16-QAM system and reception of received signal R. The probabilities are calculated in the same manner with respect to the other 16-QAM symbols. Thus, sixteen posterior probabilities in all are obtained as calculation results.

The first through fourth adder circuits 112-1 through 112-4 operate in the same way as the first through fourth adder circuits of FIG. 2. Thus, the first adder circuit 112-1 of FIG. 4 calculates the numerator of equation (11) when i=1, i.e., the sum of the probabilities with respect to the symbols each having 0 as the first bit:

S0000, S0001, S0010, S0011,
S0100, S0101, S0110, S0111.

Adder circuits 112-2 to 112-4 calculate the sum of the probabilities with respect to the symbols having 0 as the second, third and fourth bits, respectively.

Adder circuit 113 calculates the denominator of equation (11), i.e., the sum of the probabilities with respect to all the 16-QAM symbols:

S0000, S0001, S0010, S0011,
S0100, S0101, S0110, S0111,
S1000, S1001, S1010, S1011,
S1100, S1101, S1110, S1111.

Divider circuits 114-1 to 114-4 are calculators for dividing the outputs of the adder circuits 112-1 to 112-4 by the output of the adder circuit 113, i.e., performing the calculation shown by equation (11). That is, the divider circuit 114-1 calculates the value of equation (11) (=P(b1=0|R)) when i=1 and outputs the calculated value as a bit metric u. The bit metric u represents the probability that in the transmitted symbol represented by the received signal, bit 1 had value 0. Also, the divider circuits 114-2 to 114-4 calculate the values of P(b2=0|R)), P(b3=0|R)), and P(b4=0|R)) and output the calculated values as bit metrics v, x, and y, respectively. These bit metrics represent the probabilities that in the transmitted symbol represented by the received signal, bits 2, 3 and 4, respectively had value 0.

Figure 5:
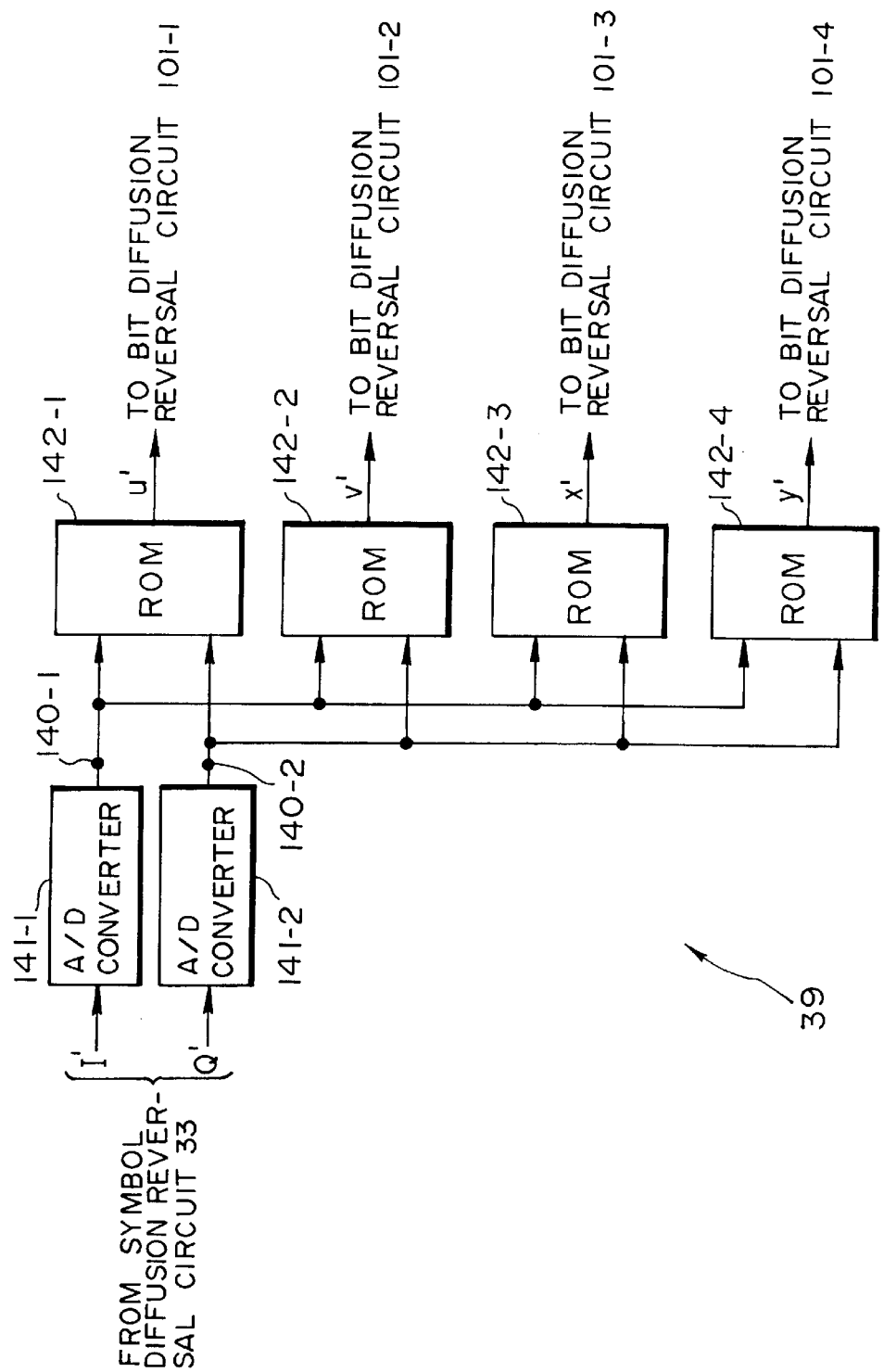
FIG. 5 is a block diagram showing the configuration of yet another example of the metric calculation circuit shown in FIG. 1.

A bit metric determination circuit according to a further embodiment of the invention is depicted in FIG. 5. The circuit of FIG. 5 uses digital words representing I component signals I' and Q-component signals Q' supplied by the symbol diffusion reversal circuit 33 (FIG. 1) to input terminals 140-1 and 140-2, respectively.

If the symbol diffusion reversal circuit 33 operates on the I and Q signals as analog quantities, analog to digital converters 141-1 and 141-2 are connected between the symbol diffusion reversal circuit and input terminals 140-1 and 140-2. In this arrangement, analog to digital (A/D) converter 141-1 converts I component signal I' supplied from the symbol diffusion reversal circuit 33 into a digital word and outputs the digital word to terminal 140-1. An A/D converter 141-2 converts Q component signal Q' supplied from the symbol diffusion reversal circuit 33 into a digital word and outputs the digital word to terminal 140-2.

If the received data is converted to digital form at the demodulator, symbol diffusion reversal circuit operates on the I and Q components as digital words, and A/D converters 141-1 and 141-2 are omitted. In either case, the digital words representing the I' and Q' component signals are supplied from terminals 140-1 and 140-2 as address data to read-only memories (ROMs) 142-1 to 142-4.

A value stored at the address specified by the address data supplied from the terminals 140-1 and 140-2 is output from the ROM 142-i (i=1, . . . , 4), as a bit metric for the bit i. As in the embodiments described above, the bit metrics for bit i are supplied to the bit diffusion reversal circuit 101-i.

The values stored in each ROM 142-i (i=1, . . . , 4), at the address specified by each value of I' and Q' correspond to the values of the sum of posterior probabilities calculated by the circuit of FIG. 2 for the same values of I' and Q'. That is, the same results which would be achieved by the metric calculation circuit 39 depicted in FIG. 2 for various values of I' and Q' are stored in ROM's 142-i, and the digitized values of I' and Q' are used as addresses to access the appropriate results. Alternatively, the ROM's may store values corresponding to the conditional posterior probabilities values obtained by the circuit of FIG. 4.

Figure 6:
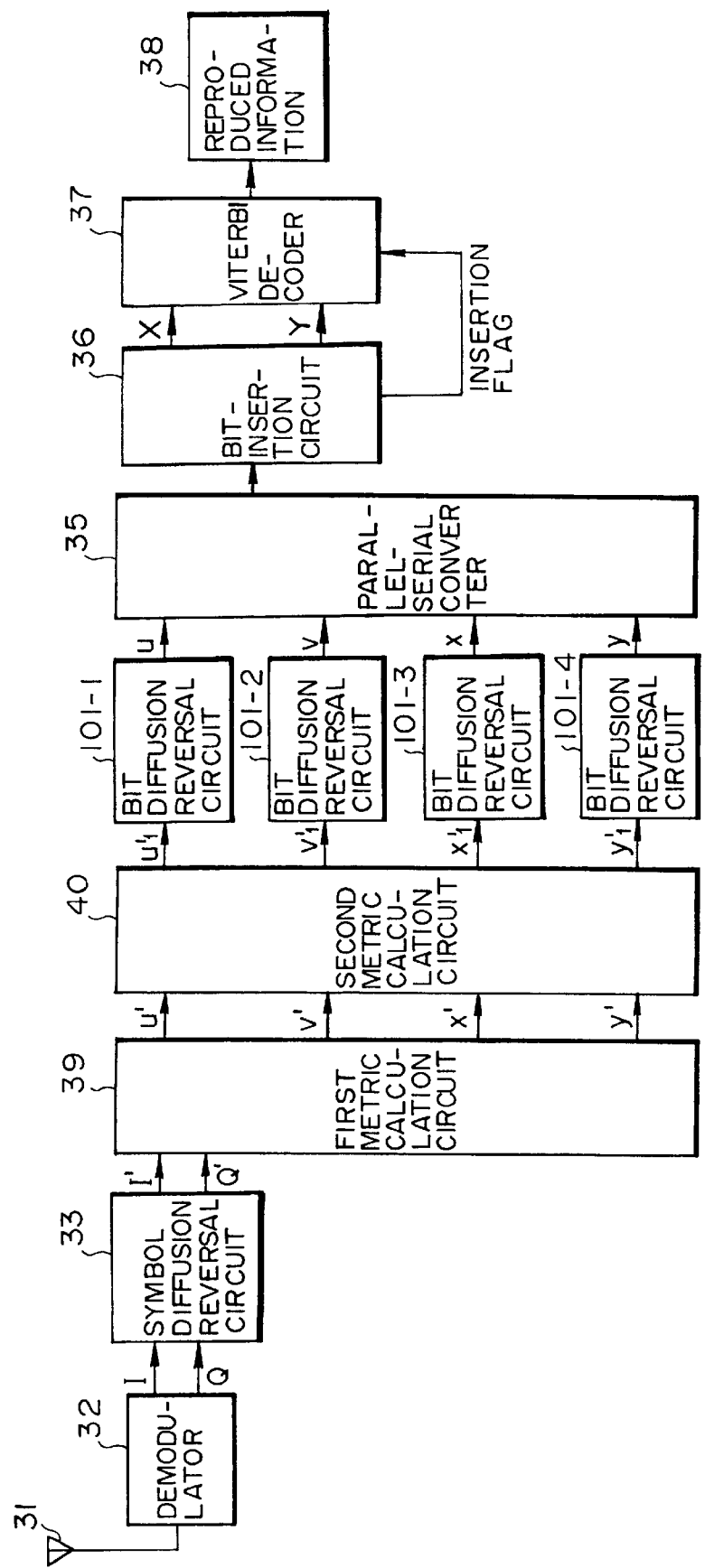
FIG. 6 is a block diagram showing the configuration of a data receiver according to another embodiment of the present invention.

FIG. 6 shows the configuration of a receiver according to a further embodiment of the present invention. The receiver shown in FIG. 6 has the same components as the receiver discussed above with reference to FIGS. 1–3. However, the bit metric calculation device used in the receiver of FIG. 6 incorporates both a first metric calculation circuit 39 identical to the bit metric calculation circuit used in the embodiment of FIGS. 1–3 and a second metric calculation circuit 40. Second metric calculation circuit 40 is connected between the first metric calculation circuit 39 and the bit diffusion reversal circuits 101-1 to 101-4.

Figure 7:
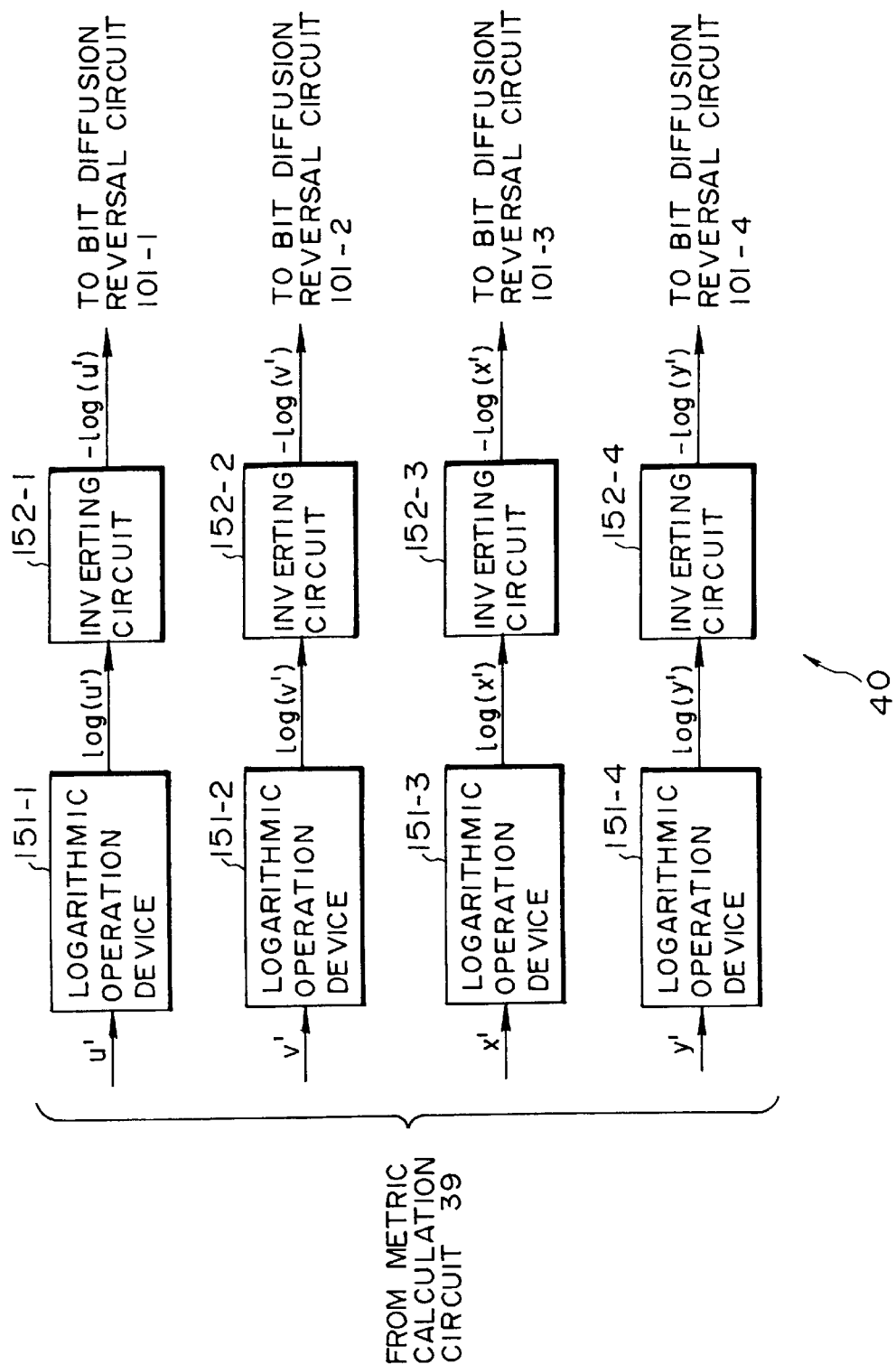
FIG. 7 is a block diagram showing the configuration of an example of the second metric calculation circuit shown in FIG. 6.

The second metric calculation circuit 40 has the configuration shown in FIG. 7. In the second metric calculation circuit 40, a first logarithmic operation device 151-1 calculates the natural logarithm of the value u' supplied from the first metric calculation circuit 39 (log(u')), and outputs the calculated value to a first inverting circuit 152-1.

A second logarithmic operation device 151-2 calculates the natural logarithm of the value v' supplied from the first metric calculation circuit 39 (log(v')), and outputs the calculated value to a second inverting circuit 152-2.

Likewise, a third logarithmic operation device 151-3 calculates the natural logarithm of the value x' supplied from the first metric calculation circuit 39 (log(x')) and outputs the calculated value to a third inverting circuit 152-3. A fourth logarithmic operation device 151-4 calculates the natural logarithm of the value y' supplied from the first metric calculation circuit 39 (log (y')) and outputs the calculated value to an inverting circuit 152-4.

The first inverting circuit 152-1 obtains the product of the value (log(u')) supplied by the logarithmic operation device 151-1 and −1 and outputs this product (−log(u')) to the bit diffusion reversal circuit 101-1 as a bit metric u1' for the first bit. Likewise, each of the second through fourth inverting circuits 152-2 through 152-4 obtains the product of the value supplied by the corresponding logarithmic operation device and −1, and outputs this product as a bit metric for the corresponding bit. Thus, the bit metric (−log(v')) is supplied to circuit 101-2; the bit metric (−log (x')) is supplied to circuit 101-3; and the bit metric (−log(y')) is supplied to circuit 101-4.

If signal R received by the receiver is dependent with respect to time, the Viterbi decoder 37 performs decoding by selecting a sequence such that the product of the above-described conditional posterior probabilities P(bi=0≡R) for all bits constituting the sequence:

$$P(\{bi(t)\}|\{R(t)\}) = \Pi P(bi(t) = 0 | R(t)) \qquad (12)$$
$$= \Pi(P(bi(t) = 0 \cap R(t))/P(R(t)))$$
$$= \Pi P(bi(t) = 0 \cap R(t))/P(R(t)))$$

is maximum (i.e., a maximum likelihood path).

In this equation, R(t) represents a received signal at time t, {R(t)} represents a received signal sequence, and P({R(t)}) represents the probability that a received signal sequence is {R(t)}. Also, bi(t) is the value (0 or 1) of the bit i incorporated in a symbol transmitted at time t, and {bi(t)} represents a transmitted bit data sequence. If the sequence length is 2, {bi(t)} is formed four ways as {00}, {01}, {10} and {11} since each bit can have either of two values (0 or 1) at each of two times t. If the sequence length is 3, {bi(t)} is formed eight ways. If the sequence length is 4, {bi(t)} is formed sixteen ways.

The Viterbi decoder 37 selects a likeliest transmitted sequence (maximum likelihood path) from these plurality of sequences when signal sequence {R(t)} is received. That is, the Viterbi decoder 37 selects a path on which the product of the above-described conditional posterior probabilities P(bi=0|R) is maximized. The Viterbi decoder 37 may select a path on which the numerator ΠP(bi(t)=0∩R(t)) of equation (12) is maximized since the denominator ΠP(R(t))) of equation (12) does not depend upon the kind of path.

Further, in the embodiment of FIG. 6, the functional form of the probability P(bi(t)=0∩R(t)) (P(bi=0∩R) at time t) which is the metric in the first embodiment is assumed to be an exponential function as shown below.

$$P(bi(t)=0 \cap R(t))=\exp(-Ai(t)) \qquad (13)$$

Then the numerator ΠP(bi(t)=0∩R(t)) of equation (12) is:

$$\Pi P(bi(t)=0 \cap R(t))=\Pi\exp(-Ai(t))=\exp(-\Sigma Ai(t)) \qquad (14)$$

and the Viterbi decoder 37 may select, as a maximum likelihood path, a path on which the value of an expression:

$$\Sigma Ai(t)=\Sigma(-\log(P(bi(t)=0 \cap R(t)))) \qquad (15)$$

is minimized.

Accordingly, the bit metric for each bit i at time t is obtained as the value of an expression:

$$-\log(P(bi(t)=0 \cap R(t))). \qquad (16)$$

That is, in the embodiment of FIGS. 1–3, the bit metric calculation circuit 39 calculates the bit metric expressed as $$P(bi(t)=0 \cap R(t))) \qquad (17)$$

Figure 8:
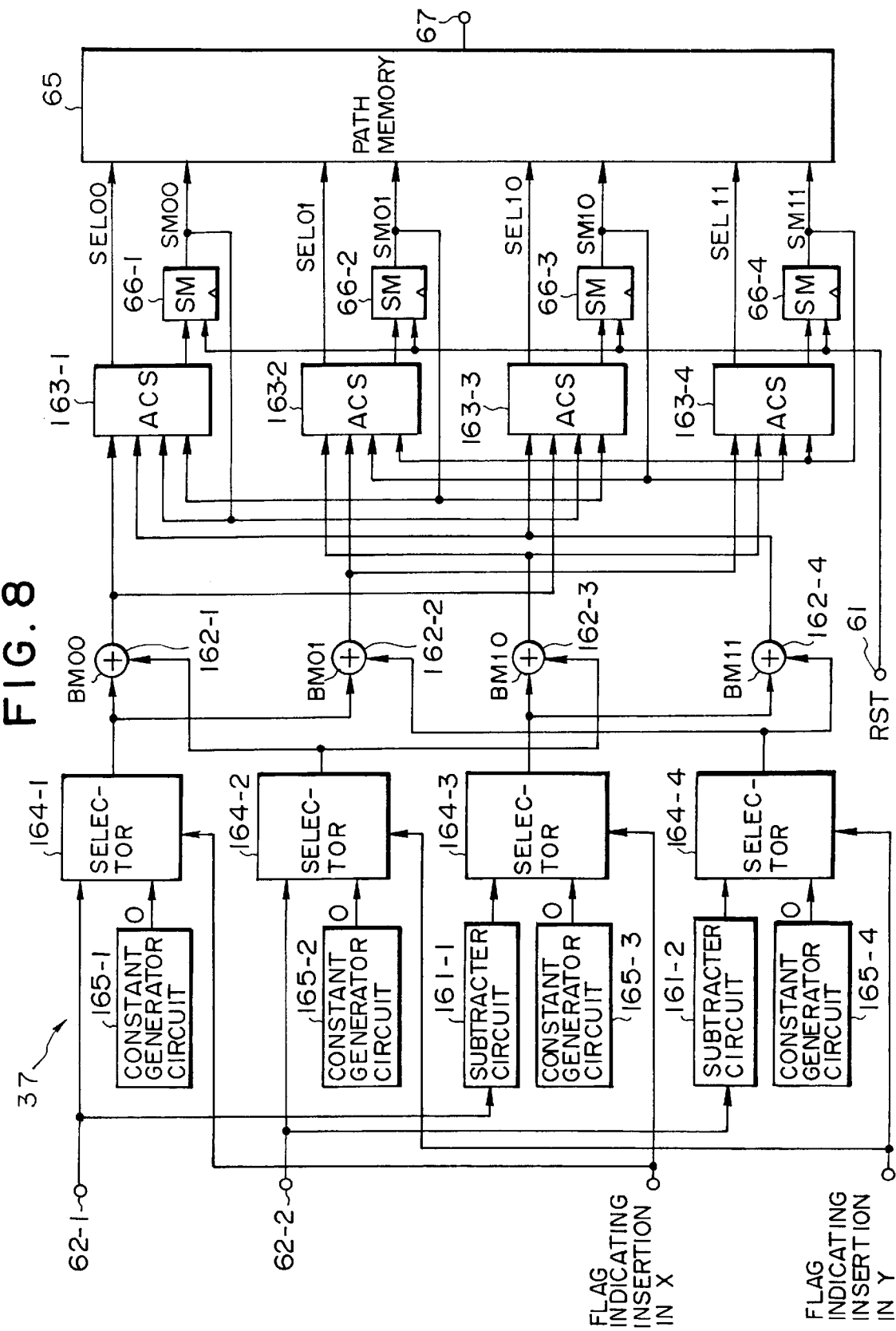
FIG. 8 is a block diagram showing the configuration of an example of the Viterbi decoder shown in FIG. 6.
Figure 9:
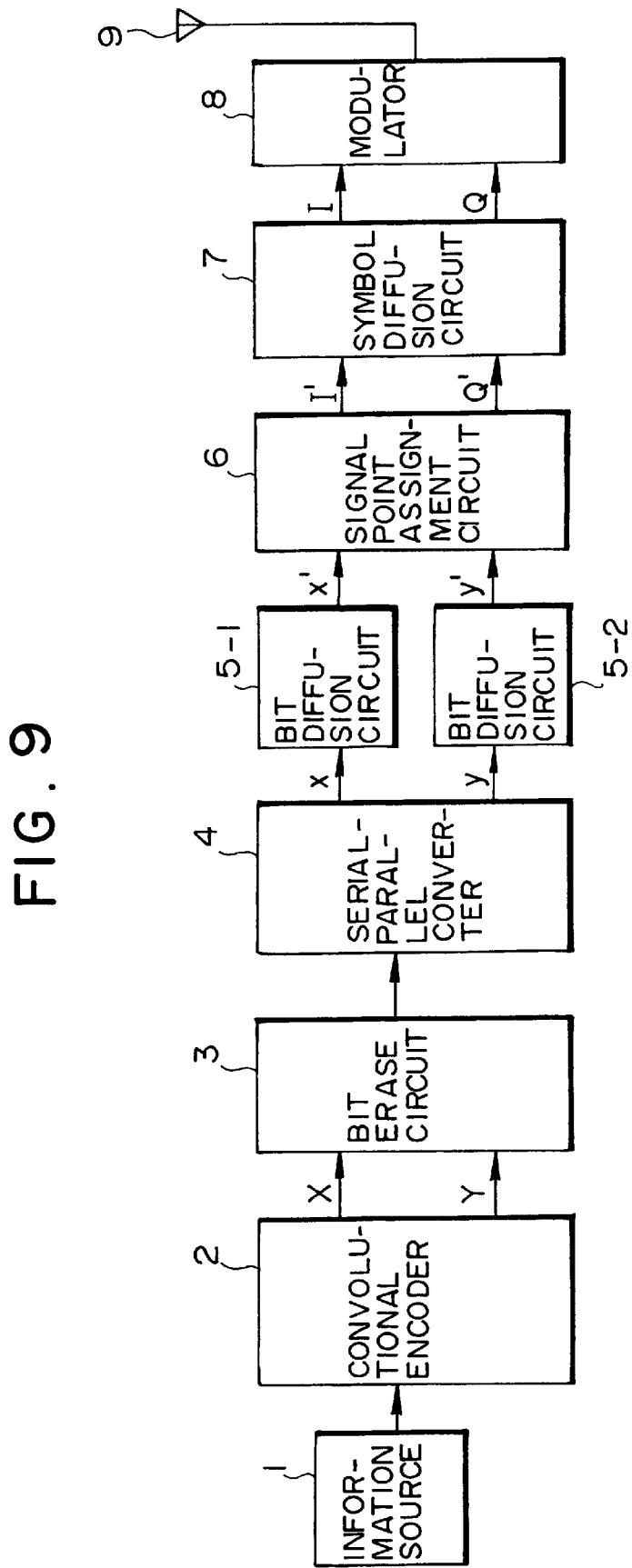
FIG. 9 is a block diagram showing the configuration of a conventional data QPSK transmitter.
Figure 10:
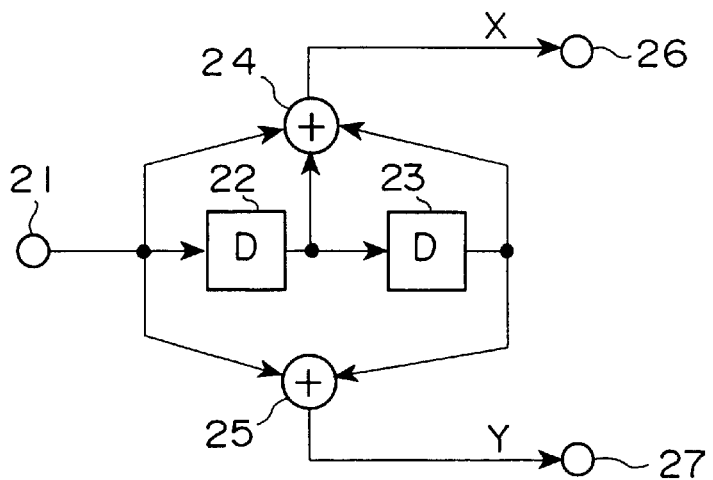
FIG. 10 is a block diagram showing the configuration of an example of the convolutional encoder shown in FIG. 9.

In contrast, in the embodiment of FIGS. 6–8, the second metric calculation circuit 40 multiplies the natural logarithm of the value calculated by the first metric calculation circuit 39 (obtained in accordance with expression (17)) and −1 together, thereby calculating the metric in accordance with expression (16).

The logarithmic operation devices 151-1 to 151-4 may alternatively be arranged to calculate the common logarithm (logarithm of base 10) or the logarithm of any other base instead of the natural logarithm (logarithm of base e).

The bit metric determination circuit shown in FIG. 5 may be used in place of the combined first and second metric circuits of FIGS. 6 and 7. Thus, the logarithms of the sums of the above-described posterior probabilities corresponding to the values of I component I' and Q component Q' of received signal R are stored in ROMs 142-i (i=1, . . . , 4) as the metrics for the bit i.

FIG. 8 shows the configuration of the Viterbi decoder 37 utilized in the embodiment of FIG. 6. In the Viterbi decoder 37 shown in FIG. 8, data X supplied through terminal 62-1 is composed of bit metrics corresponding to the exponent of an exponential function defining the probability that the first bit of a symbol is 0, or that the third bit is 0, i.e., the inverted logarithmic values (−log(u')) and (−log(x')) computed by the second metric circuit 40. Data Y supplied through terminal 62-2 is composed of bit metrics corresponding to the exponent of an exponential function defining the probability that the second bit of the symbol is 0 or that the fourth bit is 0, i.e., the inverted logarithmic values (−log(v')) and (−log(y')) computed by the second metric circuit 40.

The value X input through the input terminal 62-1 is input to a selector 164-1 and to a subtracter circuit 161-1. The subtracter circuit 161-1 subtracts X from the maximum value of the exponent and thereafter outputs the difference to a selector 164-3. The value Y input through the input terminal 62-2 is input to a selector 164-2 and to a subtracter circuit 161-2. The subtracter circuit 161-2 subtracts Y from the maximum value of the exponent and thereafter outputs the difference to a selector 164-4.

The selector 164-1 is supplied with the value 0 which is output from a constant generator circuit 165-1 and the value X from the input terminal 62-1. When the flag indicating insertion in X sent by the bit insertion circuit 36 is input to the selector 164-1, the selector 164-1 selects the value 0 generated by the constant generator circuit 165-1. When no flag indicating insertion in X is input, the selector 164-1 selects the value X. The selector 164-1 outputs the selected value to adder circuits 162-1 and 162-2.

The selector 164-2 is supplied with the value 0 which is output from a constant generator circuit 165-2 and the value Y from the input terminal 62-2. When the flag indicating insertion in Y sent by the bit insertion circuit 36 is input to the selector 164-2, the selector 164-2 selects the value 0 generated by the constant generator circuit 165-2. When no flag indicating insertion in Y is input, the selector 164-2 selects the value Y. The selector 164-2 outputs the selected value to adder circuits 162-1 and 162-3.

The selector 164-3 is supplied with the value 0 which is output from a constant generator circuit 165-3 and the value from the subtraction circuit 161-1 obtained by subtracting the value X from the maximum value of the exponent. When the flag indicating insertion in X sent by the bit insertion circuit 36 is input to the selector 164-3, the selector 164-3 selects the value 0 generated by the constant generator circuit 165-3. When no flag indicating insertion in X is input, the selector 164-3 selects the value obtained by subtracting the value X from the maximum value of the exponent. The selector 164-3 outputs the selected value to adder circuits 162-3 and 162-4.

The selector 164-4 is supplied with the value 0 which is output from a constant generator circuit 165-4 and the value from the subtraction circuit 161-2 obtained by subtracting the value Y from the maximum value of the exponent. When the flag indicating insertion in Y sent by the bit insertion circuit 36 is input to the selector 164-4, the selector 164-4 selects the value 0 generated by the constant generator circuit 165-4. When no flag indicating insertion in Y is input, the selector 164-4 selects the value obtained by subtracting the value Y from the maximum value of the exponent. The selector 164-4 outputs the selected value to the adder circuits 162-2 and 162-4.

The adder circuit 162-1 calculates the sum of the value supplied from the selector 164-1 and the value supplied from the selector 164-2, and outputs the sum of these values as branch metric BM00. The adder circuit 162-2 calculates the sum of the value supplied from the selector 164-1 and the value supplied from the selector 164-4, and outputs the sum of these values as branch metric BM01. The adder circuit 162-3 calculates the sum of the value supplied from the selector 164-2 and the value supplied from the selector 164-3, and outputs the sum of these values as branch metric BM10. The adder circuit 162-4 calculates the sum of the value supplied from the selector 164-3 and the value supplied from the selector 164-4, and outputs the sum of these values as branch metric BM11.

The output BM00 of the adder circuit 162-1 and the output BM11 of the adder circuit 162-4 are input to ACS circuits 163-1 and 163-3. The output BM01 of the adder circuit 162-2 and the output BM10 of the adder circuit 162-3 are input to ACS circuits 163-2 and 163-4.

An output SM00 from a state metric storage 66-1 and an output SM01 from a state metric storage 66-2 are also input to the ACS circuits 163-1 and 163-3. An output SM10 from a state metric storage 66-3 and an output SM11 from a state metric storage 66-4 are also input to the ACS circuits 163-2 and 163-4.

The ACS circuits 163-1 to 163-4 calculate new state metrics from the branch and state metrics which are input to the ACS circuits. The ACS circuits output the results of these calculation to the state metric storages 66-1 to 66-4, and also output information SEL00 to SEL11 corresponding to a selected path to a path memory 65.

The ACS circuits 163-1 to 163-4 of the Viterbi decoder 37 of FIG. 8 add the branch metrics to the state metrics to update the path metrics. Therefore, each of the selectors 164-1 and 164-3 is arranged to output the value 0 generated by the constant generator circuit 133-1 or 133-3 to the adder circuit 162-1 or 162-3 when the flag indicating insertion in X is input to the selector. Also, each of the selectors 164-2 and 164-4 is arranged to output the value 0 generated by the constant generator circuit 133-2 or 133-4 to the adder circuit 162-2 or 162-4 when the flag indicating insertion in Y is input to the selector. This prevents the dummy data inserted by the bit insertion circuit from influencing the branch metric and state metric calculation results.

In the above-described embodiments, data modulated in accordance with a 16-QAM modulation scheme is demodulated and decoded. However, the present invention is also useful with other multi-value multi-component modulation systems such as 64-QAM or 256-QAM in which each symbol denotes more than two bits. In the 16-QAM, 64-QAM and 256-QAM systems, each of I and Q components denotes two or more bits. The present invention also can be applied to 8-PSK modulation and still other multi-value, multi-component modulation systems. In some of these systems, one component may denote only one bit. Further, although conventional modulation systems use two orthogonal components, the present invention can be applied to modulation systems having a greater number of components in each transmitted signal. Multi-component modulation systems are also known as multi-phase modulation systems.

The present invention can be employed with any transmission medium. Thus, although the transmitters and receivers discussed above employ electromagnetic (radio) waves as the transmission medium, the invention can also be used with optical transmission media, such as in encoding and decoding data sent in a fiber optic transmission system.

Any other bit diffusion algorithms and/or symbol diffusion algorithms, and the corresponding bit diffusion reversal and symbol diffusion reversal processes, can be used in place of the bit diffusion and symbol diffusion processes and reversal processes used in the embodiments discussed above. Likewise, other bit erasing and bit inserting processes can be substituted for those shown. In still further embodiments, features such as bit diffusion, symbol diffusion and/or bit erasing can be omitted from the transmitter, and in this case the corresponding reversal process is omitted from the receiver.

The Viterbi decoders discussed above can be replaced by other types of decoders. Where a convolutional code is employed, the decoder most preferably is a most likely path decoder, i.e., a decoder which determines the content of the reproduced data be determining the most likely path or series of states represented by the received data. The decoder circuit and other circuits described above can be replaced in whole or in part by programmable microprocessors programmed to perform equivalent functions.

The disclosure of the copending, commonly assigned United States Patent Application of Tamotsu Ikeda entitled DATA RECEIVER USING APPROXIMATED BIT METRICS and claiming priority of Japanese Patent Application P08-231746, and the disclosure of the copending, commonly assigned United States Patent Application of Tamotsu Ikeda entitled APPARATUS AND METHOD FOR RECEIVING DATA WITH BIT INSERTION and claiming priority of Japanese Patent Application P08-233057, both of said United States Patent Applications being filed on even date herewith, are hereby incorporated by reference herein.

As these and other variations and combinations of the features discussed above can be utilized without departing from the present invention, the foregoing description of the preferred embodiments should be taken as illustrating, rather than as limiting, the invention as defined by the claims.

What is claimed is:

1. A data receiver for receiving data including a series of multi-component signals representing symbols selected from a set of possible multi-component, multi-value symbols, each signal denoting values for more than two bits, said data receiver comprising:

bit metric calculation means for calculating a bit metric for a particular bit i, the bit metric is calculated based on $\Sigma P(S_j \cap R)$, wherein $P(S_j \cap R)$ represents the probability of transmission of symbol $S_j$ and reception of received signal R, and $\Sigma P(S_j \cap R)$ represents the sum of the probabilities $P(S_j \cap R)$ of all symbols $S_j$ in which the particular bit has a given value, the given value being 0 or 1.

2. A data receiver as claimed in claim 1, wherein the bit metric is calculated as $(\Sigma P(S_j \cap R))/(\Sigma P(S_k \cap R))$, wherein $P(S_k \cap R)$ represents the probability of transmission of symbol $S_k$ and reception of received signal R, and $\Sigma P(S_k \cap R)$ represents the sum of the probabilities $P(S_k \cap R)$ of all the set of possible multi-component, multi-value symbols.

3. A data receiver as claimed in claim 1, further comprising logarithmic operation means for calculating a logarithm of the bit metric and inverting means for calculating the product of −1 and the logarithm of the bit metric.

4. A data receiver for receiving data including a series of multi-component signals representing symbols selected from a set of possible multi-component, multi-value symbols, each signal denoting values for more than two bits, said data receiver comprising:

(a) a memory having stored therein a set of bit metrics for a particular bit having a predetermined value in the transmitted signal, different bit metrics being stored at different addresses in said memory; and (b) reading means for selecting at least one address in said memory for each received signal based upon the components of such received signal and reading out of said memory the bit metric stored at each selected address, said reading means and said stored set of bit metrics being arranged so that, for any received signal, the bit metric read out from said memory for each particular bit i will be substantially equal to the bit metric found by calculating a bit metric for such particular bit i based on $\Sigma P(S_j \cap R)$, wherein $P(S_j \cap R)$ represents the probability of transmission of symbol $S_j$ and reception of received signal R, and $\Sigma P(S_j \cap R)$ represents the sum of the probabilities $P(S_j \cap R)$ of all symbols $S_j$ in which the particular bit i has a given value, said given value being 0 or 1.

5. A data receiver as claimed in claim 4, wherein said reading means and said stored set of bit metrics are arranged so that, for any received signal, the bit metric read out from said memory for each particular bit i will be substantially equal to the bit metric found by calculating a bit metric for such particular bit i based on $(\Sigma P(S_j \cap R))/(\Sigma P(S_k \cap R))$, wherein $P(S_k \cap R)$ represents the probability of transmission of symbol $S_k$ and reception of received signal R, and $\Sigma P(S_k \cap R)$ represents the sum of the probabilities $\Sigma P(S_k \cap R)$ of all of the set of possible multi-component, multi-value symbols.

6. A data receiver as claimed in claim 4, wherein said reading means and said stored set of bit metrics are arranged so that, for any received signal, the bit metric read out from said memory for each particular bit i will be substantially equal to −1 times a logarithm of a function of $\Sigma P(S_j \cap R)$.

7. A data receiver as claimed in claim 4, further comprising logarithmic operation means for calculating a logarithm of the bit metric and inverting means for calculating the product of −1 and the logarithm of the bit metric.

8. A method of receiving data including a series of multi-component signals representing symbols selected from a set of possible multi-component, multi-value symbols, each signal denoting values for more than two bits, the method comprising:

calculating a bit metric for a particular bit i, the bit metric being calculated based on $\Sigma P(S_j \cap R)$, wherein $P(S_j \cap R)$ represents the probability of transmission of symbol $S_j$ and reception of received signal R, and $\Sigma P(S_j \cap R)$ represents the sum of the probabilities $P(S_j \cap R)$ of all symbols $S_j$ in which the particular bit has a given value, the given value being 0 or 1.

9. The method as claimed in claim 8, wherein the bit metric is calculated as $(\Sigma P(S_j \cap R))/\Sigma P(S_k \cap R))$, wherein $P(S_k \cap R)$ represents the probability of transmission of symbol $S_k$ and reception of received signal R, and $\Sigma P(S_k \cap R)$ represents the sum of the probabilities $P(S_k \cap R)$ of all the set of possible multi-component, multi-value symbols.

10. The method as claimed in claim 8, further comprising the step of calculating a logarithm of the bit metric and calculating the product of −1 and the logarithm of the bit metric.

11. A method of receiving data including a series of multi-component signals representing symbols selected from a set of possible multi-component, multi-value symbols, each of the signals denoting values for more than two bits, the method comprising:

providing a memory having stored therein a set of bit metrics for a particular bit having a predetermined value in the transmitted signal, different bit metrics being stored at different addresses in the memory;

selecting at least one address in the memory for each received signal based upon the components of such received signal; and reading out of the memory the bit metric stored at each selected address so that, for any received signal, the bit metric read out from the memory for each particular bit i will be substantially equal to the bit metric found by calculating a bit metric for such particular bit i based on $\Sigma P(S_j \cap R)$, wherein $P(S_j \cap R)$ represents the probability of transmission of symbol $S_j$ and reception of received signal R, and $\Sigma P(S_j \cap R)$ represents the sum of the probabilities $P(S_j \cap R)$ of all symbols $S_j$ in which the particular bit i has a given value, the given value being 0 or 1.

12. The method as claimed in claim 11, wherein the reading out step is performed so that, for any received signal, the bit metric read out from the memory for each particular bit i will be substantially equal to the bit metric found by calculating a bit metric for such particular bit i based on $(\Sigma P(S_j \cap R))/(\Sigma P(S_k \cap R))$, wherein $P(S_k \cap R)$ represents the probability of transmission of symbol $S_k$ and reception of received symbol R, and $\Sigma P(S_k \cap R)$ represents the sum of the probabilities $P(S_k \cap R)$ of all of the set of possible multi-component, multi-value symbols.

13. The method as claimed in claim 11, wherein the reading out step is performed so that, for any received signal, the bit metric read out from the memory for each particular bit i will be substantially equal to −1 times a logarithm of function of $\Sigma P(S_j \cap R)$.

14. The method as claimed in claim 11, further comprising calculating a logarithm of the bit metric and calculating the product of −1 and the logarithm of the bit metric.

* * * * *

UNITED STATES PATENT AND TRADEMARK OFFICE
CERTIFICATE OF CORRECTION

PATENT NO. : 6,381,727 B1
DATED : April 30, 2002
INVENTOR(S) : Tamotsu Ikeda

It is certified that error appears in the above-identified patent and that said Letters Patent is hereby corrected as shown below:

Column 15,
Line 66, "of a does" should read -- of σ does --.

Column 16,
Line 1, "Therefore, a can" should read -- Therefore, σ can --.

Column 17,
Line 40, "y2 Dummy" should read -- y2. Dummy --.

Column 22,
Line 32, "I component" should read -- I-component --.

Column 27,
Line 60, "symbol and" should read -- symbol $S_j$ --.

Signed and Sealed this

Twenty-fourth Day of December, 2002

JAMES E. ROGAN
*Director of the United States Patent and Trademark Office*